(12) United States Patent
Lim

(10) Patent No.: US 8,917,912 B2
(45) Date of Patent: Dec. 23, 2014

(54) OBJECT IDENTIFICATION SYSTEM AND METHOD OF IDENTIFYING AN OBJECT USING THE SAME

(75) Inventor: Dae-Sung Lim, Seoul (KR)

(73) Assignee: Kiwiple Co., Ltd., Seoul (KR)

( * ) Notice: Subject to any disclaimer, the term of this patent is extended or adjusted under 35 U.S.C. 154(b) by 170 days.

(21) Appl. No.: 13/521,670

(22) PCT Filed: Jan. 11, 2011

(86) PCT No.: PCT/KR2011/000174
§ 371 (c)(1),
(2), (4) Date: Jul. 11, 2012

(87) PCT Pub. No.: WO2011/087249
PCT Pub. Date: Jul. 21, 2011

(65) Prior Publication Data
US 2012/0321199 A1    Dec. 20, 2012

(30) Foreign Application Priority Data

Jan. 12, 2010   (KR) .................. 10-2010-0002711

(51) Int. Cl.
*G06K 9/00*    (2006.01)
*G06K 9/48*    (2006.01)
*G06K 9/62*    (2006.01)

(52) U.S. Cl.
CPC .......... *G06K 9/00664* (2013.01); *G06K 9/6201* (2013.01)
USPC ................ 382/113; 382/199; 382/224

(58) Field of Classification Search
None
See application file for complete search history.

(56) References Cited

U.S. PATENT DOCUMENTS

| | | | | |
|---|---|---|---|---|
| 2010/0142850 | A1* | 6/2010 | Weiner et al. | 382/275 |
| 2011/0038545 | A1* | 2/2011 | Bober et al. | 382/190 |
| 2011/0064312 | A1* | 3/2011 | Janky et al. | 382/195 |

FOREIGN PATENT DOCUMENTS

| | | |
|---|---|---|
| KR | 2008-0022983 A | 3/2008 |
| KR | 2008-0078217 A | 8/2008 |
| KR | 2009-0001667 A | 1/2009 |

OTHER PUBLICATIONS

International Search Report.

* cited by examiner

*Primary Examiner* — Bhavesh Mehta
*Assistant Examiner* — David F Dunphy
(74) *Attorney, Agent, or Firm* — Harness, Dickey & Pierce

(57) ABSTRACT

An object identification system calculates boundaries between real objects from images of the real objects, and calculates first indicators which correspond to each angles of a first angle section divided into a first angle gap and which varies every boundary between the calculated real objects. The object identification system extracts a virtual object having an outline firstly meet with a radiating line corresponding to each map angle of the divided into a second angle gap, and generate a set of second indicators corresponding to each map angle. The object identification system matches the first indicators into second indicators having a repeat ratio substantially equal to a repeat ratio of the first indicators in an angle section, and extracts virtual objects matched with each of the previewed real objects.

12 Claims, 9 Drawing Sheets

OBJECT IDENTIFICATION SYSTEM AND METHOD OF IDENTIFYING AN OBJECT USING THE SAME

CROSS-REFERENCE TO RELATED APPLICATIONS

This application relies for priority upon Korean Patent Application No. 10-2010-0002711 filed on Jan. 12, 2010 in the Korean Intellectual Property Office (KIPO), the contents of which are herein incorporated by reference in their entirety.

BACKGROUND OF THE INVENTION

1. Technical Field

Exemplary embodiments of the present invention relate to an object identification system and a method of identifying an object using the system. More particularly, exemplary embodiments of the present invention relate to an object identification system for more accurately identifying an object and a method of identifying an object using the system.

2. Discussion of the Related Art

Recently, a concern for augmented reality technology has been increased, which identifies a real object such as a build through a camera of a mobile communication terminal (i.e., a mobile terminal) or displays information for a subject previewed through the camera on a screen of the mobile terminal in a virtual.

Several kinds of building identifying method through a camera have been suggested; however, there are critical problems. For example, a method in which transmits an image of a building to a server computer to identify a building has no meaning as a service if the server computer does not secure image data of large capacity in advance. Moreover, a method in which identifies a building through a relatively position difference between a global positioning system (GPS) coordinate of a building and a GPS coordinate of a terminal may be only adapted to a terminal having a direction sensor and a distance sensor, since a distance between the terminal and the building and a direction value of the terminal looking the building are required. Moreover, an identification ratio of an object is reduced in accordance with a sensor error.

Thus, an object identification system and an object identification method for identifying a real object such as a building without a direction sensor or a distance sensor are required.

SUMMARY

Exemplary embodiments of the present invention provide an object identification system which more accurately identifies an object previewed on a screen.

Exemplary embodiments of the present invention provide a method of identifying an object capable of identifying an object previewed on a screen by using the above-mentioned system.

According to one aspect of the present invention, an object identification system include a first pattern data generating part, a map data storing part, a second pattern data generating part and an object identifying part. The first pattern data generating part divides a first angle section corresponding to images of previewed real objects into a first angle gap which is uniform with respect to a position where the real objects are previewed, calculates boundaries between the real objects from images of the real objects, and generates a first pattern data configured by set of first indicators which corresponds to each angles of the first angle section divided into the first angle gap and which varies every boundaries between the calculated real objects. The map data storing part stores a map data comprising virtual objects having a second indicator and an outline data as attribute value. The second pattern data generating part divides the map data into a second angle gap which is uniform with respect to a position where the real objects are previewed, extracts a virtual object having an outline firstly meet with a radiating line corresponding to each map angle of the divided into the second angle gap, and generates a second pattern data configured by set of second indicators corresponding to each map angle. The object identifying part compares with a first arrangement pattern of first indicators arranged on the first angle section and a second arrangement pattern of second indicators arranged on a second angle section substantially equal to the first angle section, matches the first indicators into second indicators having a repeat ratio substantially equal to a repeat ratio of the first indicators in an angle section, matches a real object disposed on an angle corresponding to the matched first indicator into a virtual object having a second indicator matched with the first indicator as an attribute value, and extracts virtual objects matched with each of the previewed real objects.

In an exemplary embodiment, boundaries of the previewed real objects may be calculated by adapting an image edge detection method to images of the real objects.

In an exemplary embodiment, outline data of the map data may include position values corresponding to corners of each virtual object, and outlines of each virtual object may be a straight line connecting position values of neighboring corners of each virtual object. Alternatively, an outline data of the virtual object may include a position value of the virtual object and relative position values between corners of the virtual object and the position value of the virtual object, positions of each corners of the object are calculated by a position value of the virtual object and relative position values between corners of the virtual object and a position value of the virtual object. Outlines of each of the virtual objects on the map data may be a straight line connecting adjacent corner positions of each of the virtual objects.

In an exemplary embodiment, the first angle gap may be one of n times ('n' is an integer) and 1/n times of the second angle gap.

In an exemplary embodiment, the first pattern data generating part, the map data storing part, the second pattern data generating part and the object identifying part may be included in a server computer. In this case, the server computer may receive images of the previewed real objects and position value of a mobile terminal from the mobile terminal. The position value of the mobile terminal may correspond to a position where the real objects are previewed. The server computer may transmit an attribute value of a virtual object matched with the previewed real object to the mobile terminal.

In another exemplary embodiment, the first pattern data generating part may be included in a mobile terminal. The second pattern data generating part and the object identifying part may be included in a server computer. The server computer may receive a position value of a mobile terminal and the first pattern data generated in the first pattern data generating part from the mobile terminal.

In another exemplary embodiment, the object identification system may include a mobile terminal having the first pattern data generating part, the map data storing part, the second pattern data generating part and the object identifying part.

According to another aspect of the present invention, there is provided a method of identifying an object. In the method, a first angle section corresponding to images of previewed real objects is divided into a first angle gap which is uniform with respect to a position where the real objects are previewed. Boundaries between the real objects from images of the real objects are calculated. A first pattern data is generated, which is configured by set of first indicators which corresponds to each angles of the first angle section divided into the first angle gap and which varies every boundary between the calculated real objects. A map data comprising virtual objects having a second indicator and an outline data as attribute value is divided into a second angle gap which is uniform with respect to a position where the real objects are previewed. A virtual object is extracted, which has an outline firstly meet with a radiating line corresponding to each map angle of the divided into the second angle gap. A second pattern data is generated, which is configured by set of second indicators corresponding to each map angle. A first arrangement pattern of first indicators arranged on the first angle section is compared with and a second arrangement pattern of second indicators arranged on a second angle section substantially equal to the first angle section. The first indicators are matched into second indicators having a repeat ratio substantially equal to a repeat ratio of the first indicators in an angle section. A real object disposed on an angle corresponding to the matched first indicator is matched into a virtual object having a second indicator matched with the first indicator as an attribute value. Virtual objects matched with each of the previewed real objects are extracted.

In an exemplary embodiment, an attribute value of a virtual object matched with the previewed real object may further outputted to the previewed image.

In an exemplary embodiment, boundaries of the previewed real objects may be calculated by employing an image edge detection method to images of the real objects.

In an exemplary embodiment, the present invention may be a computer-readable storage medium storing a software program using the above mentioned object identification method.

According to still another aspect of the present invention, an object identification system is configured to divide a first angle section corresponding to images of previewed real objects into a first angle gap which is uniform with respect to a position where the real objects are previewed, calculate boundaries between the real objects from images of the real objects, and calculate first indicators which correspond to each angles of the first angle section divided into the first angle gap and which varies every boundary between the calculated real objects. The object identification system is configured to divide a map data comprising virtual objects having a second indicator and an outline data as attribute value into a second angle gap which is uniform with respect to a position where the real objects are previewed, extract a virtual object having an outline firstly meet with a radiating line corresponding to each map angle of the divided into the second angle gap, and generate a set of second indicators corresponding to each map angle. The object identification system is configured to compare with a first arrangement pattern of first indicators arranged on the first angle section and a second arrangement pattern of second indicators arranged on a second angle section substantially equal to the first angle section, match the first indicators into second indicators having a repeat ratio substantially equal to a repeat ratio of the first indicators in an angle section, match a real object disposed on an angle corresponding to the matched first indicator into a virtual object having a second indicator matched with the first indicator as an attribute value, and extract virtual objects matched with each of the previewed real objects.

In an exemplary embodiment, the present invention may be server computer identifying a virtual object matched with the previewed real object by using the above-mentioned object identification system, and transmitting an attribute value of the identified virtual object to a mobile terminal.

In an exemplary embodiment, the present invention may be a digital compass outputting an azimuth value of a virtual object matched with the previewed real object as an azimuth value of a direction previewing the real object by using the above-mentioned object identification system.

In an exemplary embodiment, the present invention may be a mobile terminal outputting an attribute value of a virtual object matched with the previewed real object by using the above-mentioned object identification system.

According to an object identification system and a method of identifying an object using the system, it may relate to a virtual object of a virtual world and a real object of a real world in a more accurate.

According to the present invention, a terminal not having a direction sensor or a distance sensor may identify a real object. Moreover, although a server does not secure image data of large capacity in advance, a terminal may identify a real object. Furthermore, since a terminal may identify a direction previewing a real object without an additional direction sensor, the terminal may play a role of a direction sensor or may complement a function of the direction sensor.

Thus, it may identify a real object in a more accurate, and it may enhance a quality of an object identification system or an augmented reality server.

BRIEF DESCRIPTION OF THE DRAWINGS

The above and other features and aspects of the present invention will become more apparent by describing in detailed exemplary embodiments thereof with reference to the accompanying drawings, in which.

DETAILED DESCRIPTION OF THE INVENTION

Figure 1:
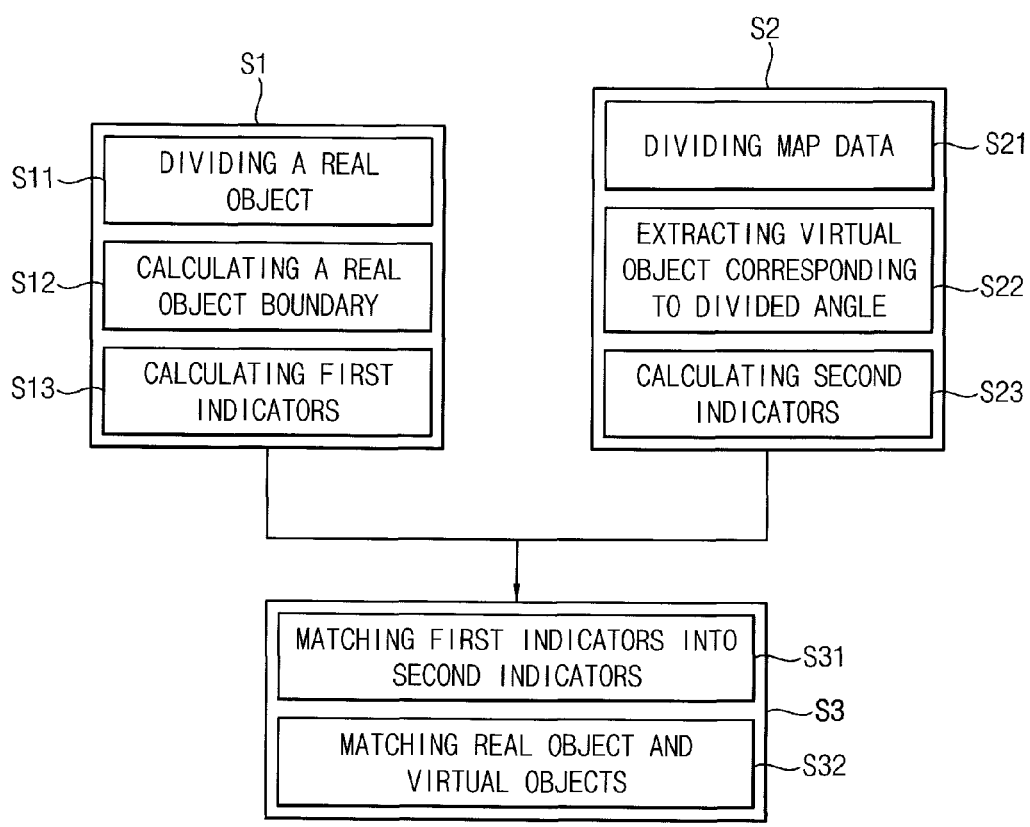
FIG. 1 is a block diagram showing a concept of an object identification method according to Exemplary Embodiment 1 of the present invention.

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Hereinafter, terms used in the present specification will be defined.

A term "preview" means that the user views an object or a target through a screen of a mobile terminal.

A term "object" means all matters or all events capable of being identified by a user. For example, the term "object" is used as a concept including a matter such as buildings or trees of which positions are fixed, a place of a predetermined position, a matter such as vehicles of which a moving path is regular, a nature matter such as the sun, the moon and the star of which a moving path according to a time is regular, industrial products having a unique number or unique mark, designs such a predetermined text, mark, trademark, a person, an event or culture performances generated at a predetermined time, etc. In the present disclosure, the term "object" mainly means a matter such as buildings or trees of which positions are fixed, a place of a predetermined position.

A term "attribute value" means whole information related to an object, which means information stored in an information write medium as a database.

The object is classified into "a real object" called as a target existed in a real world and "a virtual object" which is stored and processed by the object identification system in accordance with the real object. The virtual object corresponds to a virtual world object storing characteristics such as a position, an address, a shape, a name, a related information, a related web page address, etc., of a corresponding real object as a database. Moreover, "an attribute value of a virtual object" means information such as a position, an address, a shape, a name, a related information, a related web page address, etc., of a corresponding real object stored in an information write medium as a database. The attribute value of a virtual object may include an established year of building or sculpture, history of building or sculpture, use of building or sculpture, an age of tree, a kind of tree, etc.

A term "target real object" means a real object among real objects, which is viewed through a mobile terminal. For example, when a real object is previewed through the mobile terminal with a camera and a display and user requests information or service related to a corresponding real object, the previewed real object corresponds to a target real object. In the present disclosure, a target real object previewed on a screen may be referred to as a real object.

A term "target virtual object" means a virtual object corresponding to the target real object. For example, when the mobile terminal transmits data related to a target real object that is previewed through a mobile terminal to an object identification system and requests information or service for the target real object, the object identification system processes the transmitted data to compare the processed data with a virtual object stored in the object identification system to extract a virtual object corresponding to the target real object of the plural virtual objects. Thus, a virtual object, which is determined to correspond to the target real object by the object identification system, corresponds to a target virtual object.

A term "an attribute value of a real object matches with an attribute value of a virtual object" means that the attribute value of a real object and the attribute value of a virtual object are the same as each other or are same within an error range. For example, a term "a position value of a real object matches with a position of a virtual object" means that the two position values are the same as each other or substantially the same as each other.

A term "a real object matches with a virtual object" means that the attribute value of a real object and the attribute value of a virtual object are the same as each other or the attribute value of a real object corresponds to or relates to a virtual object having the same attribute value within an error range. For example, a term "a previewed real object (e.g., a real building) matches with a virtual object of a map data (i.e., a building one a map)" means that the previewed building (i.e., a real object) corresponds to a building (i.e., a virtual object) having the same attribute value (e.g., a position or a name) on a map, or the previewed building corresponds to a build on the map in a one-to-one correspondence.

A term "object identification" means that it is to extract a virtual object matched with the previewed real object in a real time.

Hereinafter, exemplary embodiments of the present invention will be explained in detail with reference to the accompanying drawings.

Exemplary Embodiment 1

Figure 2:
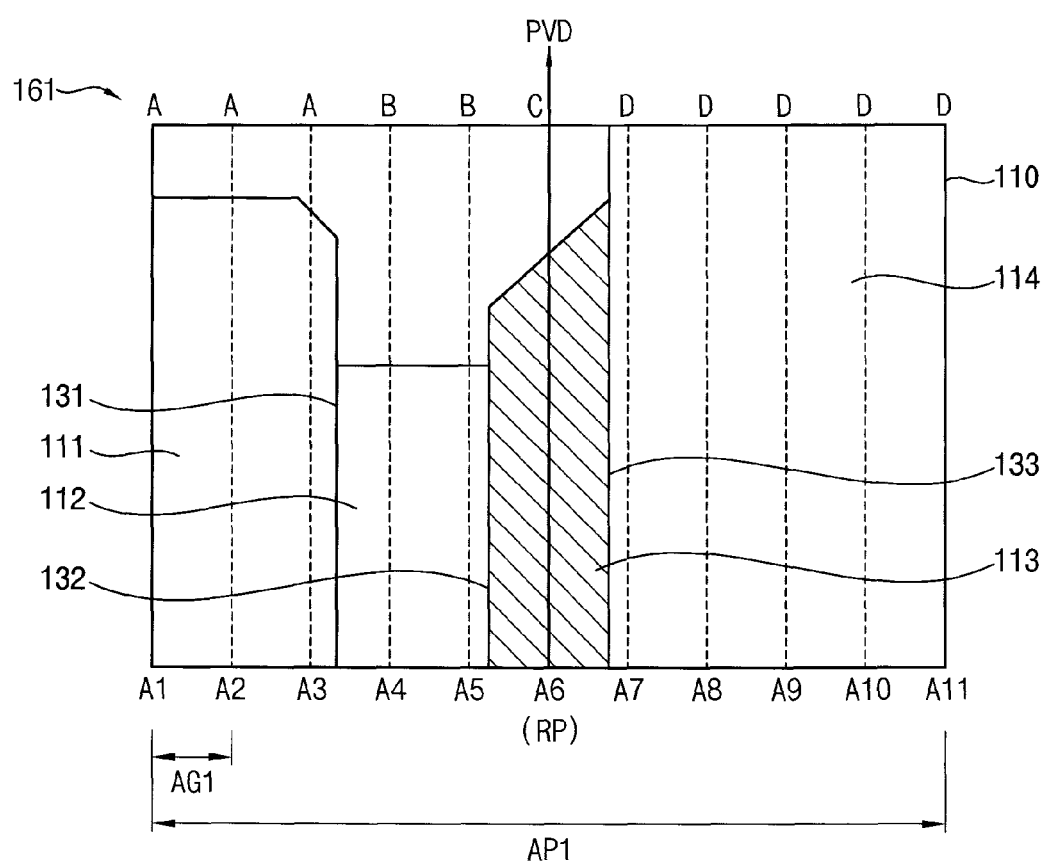
FIG. 2 is a plan view showing a display screen for explaining a method of calculating first indicators shown in FIG. 1.

FIG. 1 is a block diagram showing a concept of an object identification method according to Exemplary Embodiment 1 of the present invention. FIG. 2 is a plan view showing a display screen for explaining a method of calculating first indicators shown in FIG. 1.

Referring to FIGS. 1 and 2, an object identification method according to the present exemplary embodiment includes a step S1 dividing a first angle section AP1 corresponding to images of previewed real objects 111, 112, 113 and 114 into a first angle gap AG1 which is uniform with respect to a position RP where the real objects 111, 112, 113 and 114 are previewed, calculating boundaries 131, 132 and 133 between the real objects 111, 112, 113 and 114 from images of the real objects 111, 112, 113 and 114, and calculating a set of first indicators 161 which corresponds to each angles of the first angle section AP1 divided into the first angle gap AG1 and which varies every boundary 131, 132 and 133 between the calculated real objects 111, 112, 113 and 114.

As defined above, a term "object" means all matters capable of being identified by a user. For example, the term "object" means a matter such as buildings or trees, bronze statue of which positions are fixed. Particularly, a term "real object" means an object in a real world, for example, a real matter or a real sculpture such as a real build, a real tree, a real bronze statue, etc.

Moreover, a term "preview" means an action viewing the object or target through a display screen. For example, when a user previews the real object (e.g., a building, a sculpture, a treed, etc.) through a mobile terminal including an image identifying part such as a camera and a display displaying an image provided by the image identifying part, an image of the real object is converted by the image identifying part and the image is displayed on the display. As an example, the mobile terminal including the image identifying part and the display may be a portable telephone, a smart phone, a personal digital assistance ("PDA"), a digital video camera, etc.

The real objects 111, 112, 113 and 114 includes a first real object 111, a second real object 112, a third real object 113 and a fourth real object 114. It is assumed that the real objects 111, 112, 113 and 114 previewed on a display 110 shown in FIG. 2 are buildings. However, the present is not limited to that a real object is a building. That is, it may be adapted that a sculpture such as a building, a tower, etc., of which positions are fixed or a natural matter such as a tree, a rock, etc., of which positions are fixed is a real object.

A position RP previewing the real objects 111, 112, 113 and 114 correspond to a position of a mobile terminal including a display 110 in a real space. Moreover, a position RP previewing the real objects 111, 112, 113 and 114 on a screen of the display 110 may correspond to a center of the screen.

A first angle section AP1 corresponding to an image of the previewed first to fourth real objects 111, 112, 113 and 114 is divided into a first angle gap AG1 which is uniform with respect to a position RP wherein the real objects 111, 112, 113 and 114 that are previewed (step S11). When the first angle gap AG1 is about X degrees, a real space is divided into 360/X spaces with respect to the position RP. For example, when the first angle gap AG1 is about 7.5 degrees, a real space may be divided into forty-eight equal parts (i.e., 360/7.5=48) with respect to the position RP.

An angle range (i.e., a first angle section AP1) of a conventional display screen is about 40 degrees to about 80 degrees. In an exemplary embodiment shown in FIG. 2, it is assumed that the first angle section AP1 is about 75 degrees and the first angle gap AG1 is about 7.5 degrees. Thus, the first angle section AP1 is divided into ten equal parts. It is assumed that each angles of ten equal parts is respectively defined as a first angle A1, a second angle A2, a third angle A3, . . . , an eleventh angle A11. Although the first angle section AP1 is divided into ten equal parts, it will be understood that the total number of angles is eleven by adding one angle of a corner.

Boundaries 131, 132 and 133 between the real objects 111, 112, 113 and 114 are calculated from images of the real objects 111, 112, 113 and 114 (step S12).

In an exemplary embodiment of the present invention, boundaries between the real objects 111, 112, 113 and 114 may be calculated by adapting an image edge detection method into images of the real objects 111, 112, 113 and 114. An edge of an image is a portion that a brightness of an image pixel is rapidly varied within a digital image. Since a portion that a brightness difference is mainly generated within an image corresponds to a borderline of a matter, an edge of an image represents an information for a position of a matter, a shape of a matter, a size of a matter, a pattern of a surface, etc., shown as an image.

An image edge detection means detecting an edge of a pixel of which brightness is rapidly varied within a digital image. In an image processing field, various methods for the image edge detection has been proposed. Various algorithms detecting a substantially desired edge by removing fine outlines such as a noise image in advance are widely known.

As representative examples of the edge detection method, there may be Sobel edge detection method, Canny edge detection method, Prewitt edge detection method, Robert edge detection method, Laplacian edge detection method, etc. A detailed description or algorithm for the edge detection method is described in various theses or literatures including textbook related to a digital image processing, and thus a detailed description will be omitted.

Boundaries 131, 132 and 133 between the real objects 111, 112, 113 and 114 are calculated from image data of the real objects 111, 112, 113 and 114 by employing the image edge detection methods. That is, a first boundary 131 between the first real object 111 and the second real object 112, a second boundary 132 between the second real object 112 and the third real object 113, and a third boundary 133 between the third real object 113 and the fourth real object 114 are calculated. In an exemplary embodiment of FIG. 2, the first boundary 131 is positioned between a third angle A3 and a fourth angle A4, and the second angle 132 is positioned between a fifth angle A5 and a sixth angle A6. Moreover, the boundary 133 is positioned between a sixth angle A6 and a seventh angle A7.

First indicators 161 are generated by using each angles A1, . . . , A11 of the first angle section AP1 divided into the first angle gap AG1 and positions of boundaries 131, 132 and 133 between the calculated real objects 111, 112, 113 and 114 (step S13). The first indicators 161 correspond to each angle A1, . . . , A11 of the first angle section AP1 divided into the first angle gap AG1, and vary every boundary 131, 132 and 133 between the calculated real objects 111, 112, 113 and 114.

For example, when a first indicator 161 corresponding to a first angle A1 is "A," the first indicator 161 does not varied before an angle (i.e., an angle between a third angle A3 and a fourth angle A4) on which the first boundary 131 is positioned. Thus, a first indicator 161 corresponding to a second angle A2 and a first indicator 161 corresponding to a third angle A3 are "A" equal to a first indicator 161 corresponding to a first angle A1. Since the first indicator 161 is varied every boundary 131, 132 and 133 between the real objects 111, 112, 113 and 114, the first indicator 161 is varied with respect to an angle (i.e., an angle between a third angle A3 and a fourth angle A4) on which the first boundary 131 is positioned. That is, a first indicator 161 corresponding to a fourth angle A4 is calculated as "B" different from a first indicator (i.e., "A") corresponding to the third angle A3.

Similarly, since the first indicator (i.e., "B") is not varied before an angle (i.e., an angle between a fifth angle A3 and a sixth angle A6) on which the second boundary 132 is positioned, a first indicator 161 corresponding to a fifth angle A5 is "B" equal to a first indicator 161 corresponding to a fourth angle A4. Moreover, since the first indicator 161 is varied with respect to an angle (i.e., an angel between a fifth angle A3 and a sixth angle A6) on which the second boundary 132 is positioned, a first indicator 161 corresponding to a sixth angle A6 is calculated as "C" different from a first indicator (i.e., "B") corresponding to the fifth angle A5.

Since the first indicator 161 is varied with respect to an angle (i.e., an angle between a sixth angle A6 and a seventh angle A7) of the third boundary 133, the first indicator 161 corresponding to the seventh angle A7 is calculated as "D" different from a first indicator (i.e., "C"). Since boundaries 131, 132 and 133 between the real objects 111, 112, 113 and 114 are not positioned between the seventh angle A7 to eleventh angle A11, first indicators 161 respectively corresponding to the seventh angle A7 to eleventh angle A11 are "D."

Thus, a set of first indicators 161 is calculated, which corresponds to each angle A1, . . . , A11 of a first angle section AP1 divided into the first angle gap AG1 and varies every boundary 131, 132 and 133 between the calculated real objects 111, 112, 113 and 114.

Figure 3:
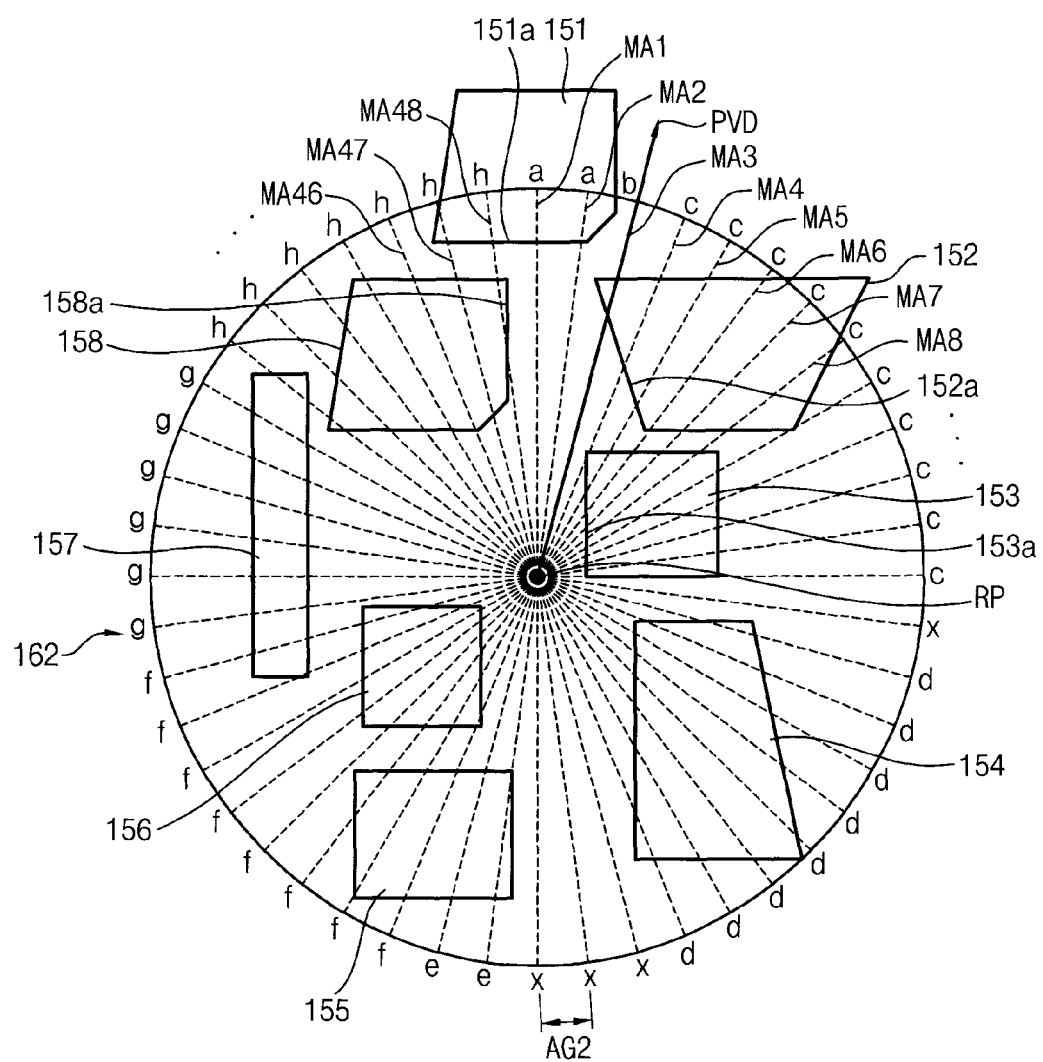
FIG. 3 is a plan view showing a map data for explaining a method of calculating second indicators shown in FIG. 1.

FIG. 3 is a plan view showing a map data for explaining a method of calculating second indicators shown in FIG. 1.

Referring to FIGS. 1, 2 and 3, in an object identification method according to the present exemplary embodiment, according to step S2, a map data, which includes virtual objects 151, 152, 153, 154, 155, 156, 157 and 158 having a second indicator 162 and an outline data as attribute value, is divided into a second angle gap AG2 which is uniform with respect to a position RP where the real objects 111, 112, 113 and 114 are previewed. Then, a virtual object having an outline firstly meet with a radiating line corresponding to each map angle of the divided into the second angle gap AG2 is extracted from the map data. Then, a second indicators set corresponding to each map angles MA1, . . . , MA48 is calculated.

As defined above, "a virtual object" correspond to a virtual world object storing characteristics such as a position, an address, a shape, a name, a related information, a related web page address, etc., of a corresponding real object as a database. For example, a virtual building, a virtual bronze statue, a virtual sculpture, a virtual nature matter, etc., existing in a map data stored in a database correspond to the virtual object. Moreover, "an attribute value of a virtual object" means information such as a position value, an address, a shape, a height, a name, a related web page address, an established year of building or sculpture, history of building or sculpture, use of building or sculpture, an age of tree, a kind of tree, etc., storable in an information write medium as a database.

In the present exemplary embodiment, the map data includes virtual object of which positions are fixed such as a virtual building, a virtual bronze statue, a virtual sculpture, a virtual nature matter, etc., and each of the virtual objects has an attribute value such as an indicator, a position value and an outline data. The attribute value of the virtual object may further include information related to the virtual object. For example, the attribute value of the virtual object may further include various information such as a name of the virtual object, an established year of the virtual object, history of the virtual object, height of the virtual object, an address of the virtual object, a web page address of the virtual object, a position value of the virtual object, a shape of the virtual object, use of the virtual object, an age of tree, a kind of tree, etc.

A term "indicator" (i.e., a second indicator) of the virtual object means unique attributes of each virtual object different from another virtual object. For example, when a virtual object is a building, a name of the building or an address of the building may be the second indicator. Alternatively, a predetermined code is set every the virtual building, and the predetermined code may be used as the second indicator.

In the present embodiment, each of the virtual objects 151, 152, 153, 154, 155, 156, 157 and 158 may be a first virtual object 151 to an eight virtual object 158, respectively. The first to eight virtual objects 151, . . . , 158 includes corresponding indicators (i.e., a second indicator). For example, it is assumed that a second indicator 162 of the first virtual object 151 is "a" and a second indicator 162 of the second virtual object 152 is "b." Moreover, it is assumed that a second indicator 162 of the third virtual object 153 is "c" and a second indicator 162 of the fourth virtual object 154 is "d." Likewise, it is assumed that a second indicator 162 of the fifth virtual object 155 is "e" and a second indicator 162 of the sixth virtual object 152 is "f." Moreover, it is assumed that a second indicator 162 of the seventh virtual object 157 is "g" and a second indicator 162 of the eighth virtual object 158 is "h."

It is assumed that virtual objects 151, 152, . . . , 158 of a map data shown in FIG. 3 are virtual buildings. However, the present is not limited to that a virtual object is a virtual building on the map data. That is, it may be adapted that a virtual sculpture such as a building, a tower, etc., on the map data of which positions are fixed or a virtual and natural matter such as a virtual tree, a virtual rock, etc., of which positions are fixed is a virtual object.

A center of a map data shown in FIG. 3 corresponds to a position RP previewing the real objects 111, 112, 113 and 114 of FIG. 2. For example, the position RP previewing the real objects 111, 112, 113 and 114 may correspond to a position of a mobile terminal including a display 110 in a real space, and the center of the map data may correspond to a position of the mobile terminal on a map.

The reason that the map data shown in FIG. 3 is a circle shape is because a map corresponding to a predetermined set distance from the previewing position PR is assumed as an effective map data. That is, a radius of the circle shape map corresponds to a distance which is required by an object identification system so as to identify an object, and it may be understood that the radius is varied as necessary. It is not necessary that a map data corresponding to a target analysis area is a circle shape. Thus, the map data corresponding to a target analysis area may be set in a polygon shape such as a square shape, a hexagon shape, etc.

The map data is divided into a second angle gap AG2 which is uniform with respect to the previewing position RP (step S21). When the second angle gap AG2 is X degrees, a virtual space of the map data is divided into 360/X spaces with respect to the position RP. For example, when the second angle gap AG2 is about 7.5 degrees, a virtual space of the map data is divided into forty-eight equal parts (i.e., 360/7.5=48) with respect to the position RP. For example, it is assumed that each angles divided into forty-eight equal parts of the map data with respect to due north on a map data are a first map angle MA1, a second map angle MA2, a third map angle MA3, a fourth map angle MA4, a fifth map angle MA5, a sixth map angle MA6, a seventh map angle MA7 and an eighth map angle MA8.

As described above, virtual objects of the map data have an outline data as an attribute value. The outline data means data for representing an outline shape of a virtual object on a map. The outline data may be data related to a two-dimensional shape of a virtual object. Alternatively, the outline data may be data related to a three-dimensional shape.

For example, when the outline data is data for representing a plan shape of a virtual object, the outline data may include position values of corners of the virtual object. In this case, a straight line connecting positions of neighboring corners of each of the virtual objects is drawn on the map data by using position values of corners of the virtual object, so that outlines of each of the virtual objects may be drawn on the map data.

Alternatively, the outline data may include a position value of the virtual object and relative position values between corners of the virtual object and the position value of the virtual object. For example, the outline data may include a relative position value such as a distance between the corner position and the virtual object position and a direction instead of absolute values of the corners. In this case, positions of each corners of the object may be calculated by a position value of the virtual object and relative position values of the corners. When a straight line connecting adjacent corner positions of each of the virtual objects is drawing on the map data, an outline of each of the virtual objects may be drawn.

Virtual radiating lines (shown as a dot line) are assumed, which correspond to each map angles MA1, . . . , MA48 of the map data divided into the second angle gap AG2 with respect to a previewing position RP. Then, a virtual object having an outline firstly meet with a radiating line corresponding to each map angles MA1, . . . , MA48 is extracted from the map data (step S22).

For example, in the map data of FIG. 3, a virtual object having an outline 151a firstly meet with a radiating line corresponding to the first map data MA1 is a first virtual object 151. A virtual object having an outline 151a firstly meet with a radiating line corresponding to the second map data MA2 is a first virtual object 151. A virtual object having an outline 151b firstly meet with a radiating line corresponding to the third map data MA3 is a first virtual object 152. A virtual object having an outline 153a firstly meet with a radiating line corresponding to the fourth map data MA4 is a third virtual object 153. Similarly, a virtual object having an outline 158a firstly meet with a radiating line corresponding to the forty-eighth map data MA48 is an eighth virtual object 158. Through the above method, virtual objects may be extracted, which have outlines firstly meet with radiating lines corresponding to the first map angle to the forty-eighth map angles MA1, . . . , MA48, respectively. That is, virtual objects corresponding to each of the map angles MA1, . . . , MA48 divided into the second angle gap AG2 are extracted (step S22).

As described above, since virtual objects extracted in correspondence with each of the map angles MA1, . . . , MA48 include corresponding second indicators 162 as an attribute value, a set of the second indicators 162 corresponding to each of the map angles MA1, . . . , MA48 may be calculated from the extracted virtual objects (step S23).

For example, a virtual object extracted in correspondence with the first map angle MA1 is a first virtual object, and the first virtual object 151 includes "a" as a second indicator 162. Thus, a second indicator 162 corresponding to the first map angle MA1 is calculated as "a." Moreover, since a virtual object extracted in correspondence with the second map angle MA2 is also the first virtual object, a second indicator 162 corresponding to the second map angle MA2 is also calculated as "a." A virtual object extracted in correspondence with the third map angle MA3 is a second virtual object 152, and the second virtual object 152 includes "b" as a second indicator 162. Thus, a second indicator 162 corresponding to the third map angle MA3 is calculated as "b." Moreover, a virtual object extracted in correspondence with the fourth map angle MA4 is a third virtual object 153, and the third virtual object 153 includes "c" as a second indicator 162. Thus, a second indicator 162 corresponding to the fourth map angle MA4 is calculated as "c." Similarly, a virtual object extracted in correspondence with the forty-eighth map angle MA48 is an eighth virtual object 158, and the eighth virtual object 158 includes "h" as a second indicator 162. Thus, a second indicator 162 corresponding to the forty-eighth map angle MA48 is calculated as "h."

When a virtual object having an outline firstly meet with a radiating line corresponding to the map angle does non-exist within a radius of the circle shape map corresponding to a target analysis area, a virtual object does not extracted. In this case, since a virtual object corresponding to the map angle is non-exist, a second indicator 162 corresponding to the map angle may be calculated as "x." In FIG. 3, for a map angle in which a virtual object having an outline firstly meet with a radiating line is non-exist, a second indicator 162 is marked as "x". As described above, a radius of a circle map corresponds to a distance which is required by an object identification system, and a virtual object for all angle may be exist when the radius of a circle map is set to be longer. In this case, it will be understood that a second indicator 162 is not calculated as "x."

A set of the second indicators 162 calculated through the method may have an arrangement pattern such as "aabcc . . . hhhhh."

In the present exemplary embodiment, it is described that the first angle gap AG1 and the second angle gap AG2 are equal to each other; however, it is not limited thereto. For example, the first angle gap AG1 is set integer times of the second angle gap AG2. Alternatively, the second angle gap AG2 is set integer times of the first angle gap AG1. That is, the first angle gap may be n times ('n' is an integer) or 1/n times of the second angle gap.

Figure 4:
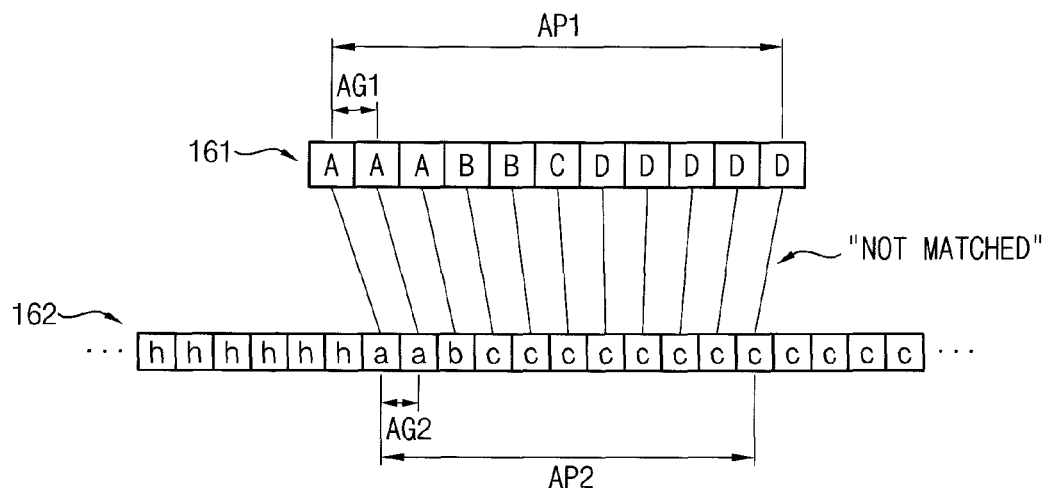
FIG. 4 and FIG. 5 are diagrams for explaining a method matching first indicators and second indicators calculated in FIG. 2 and FIG. 3.
Figure 5:
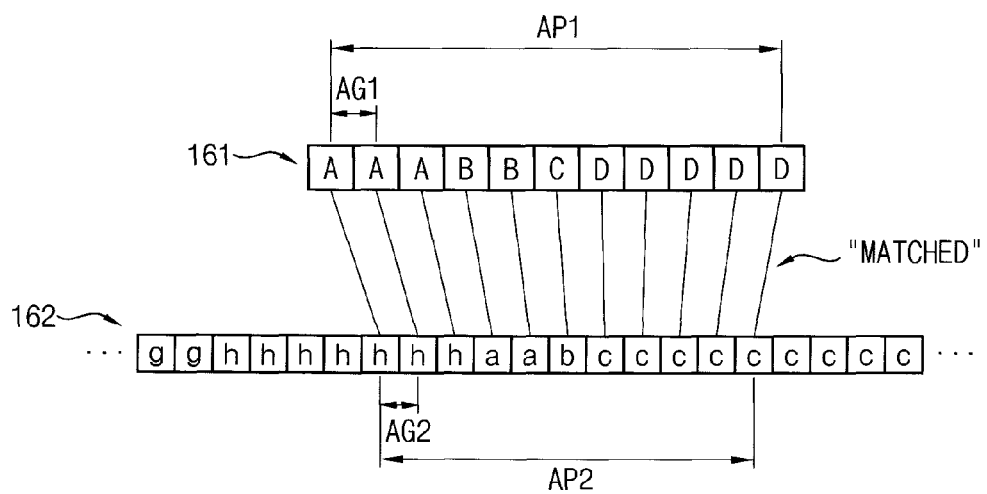

FIG. 4 and FIG. 5 are diagrams for explaining a method matching first indicators and second indicators calculated in FIG. 2 and FIG. 3.

Particularly, FIG. 4 shows that the first indicators is not matched with the second indicators, and FIG. 5 shows that the first indicators is matched with the second indicators.

Referring to FIGS. 1 to 5, an object identification method according to the present exemplary embodiment includes a step S3 comparing with a first arrangement pattern of first indicators 161 arranged on the first angle section AP1 and an arrangement pattern of second indicators 162 arranged on a second angle section AP2 having an amplitude substantially equal to the first angle section AP1, matching the first indicators 161 to second indicators 162 having a repeat ratio substantially equal to a repeat ratio of the first indicators 161 in an angle section having an equal amplitude, and matching a real object disposed at angles corresponding to the matched first indicator 161 to a virtual object having a second indicator matching with the first indicator 161 as an attribute value.

It will be described that the first indicators 161 are respectively matched with the second indicators 162 by comparing with an arrangement pattern of the first indicators 161 and an arrangement pattern of the second indicators 162.

A set of the first indicators 161 calculated through a method explained with reference to FIG. 2 has an arrangement pattern such as "AAABBCDDDDD." Moreover, a set of the second indicators 162 calculated through a method explained with reference to FIG. 2 has an arrangement pattern such as "aabcc . . . hhhhh."

A term "matching with a first indicator 161 and a second indicator 162" means that a first indicator 161 such as an indicator "A," an indicator "B," an indicator "C," an indicator "D," etc., is coupled with the second indicators 162 such as an indicator "a," an indicator "b," an indicator "c", . . . , an indicator "g", an indicator "h", etc. For example, it means that an indicator "A" that is a first indicator 161 corresponding to the first angle A1 corresponds to one of an indicator "a", an indicator "b", an indicator "c", . . . , an indicator "g" that is the second indicator 162. Namely, the meaning "matching with a first indicator 161 and a second indicator 162" is that it is determined whether or not one of the indicator "a", an indicator "b", an indicator "c", . . . , an indicator "g" (i.e., a second indicator) corresponds to the first indicator (i.e., "A").

A second indicator 162 matched with the first indicator 161 must be one. For example, when "A" that is a first indicator 161 corresponding to the first angle A1 is matched with "h", "B" that is a first indicator 161 corresponding to the fourth angle A4 does not match with the "h". Moreover, in order to match with one of the first indicators 161 and one of the second indicators 162 in a one-to-one correspondence, the number of kinds of indicators including each arrangement pattern should be equal to each other. For example, when four kinds of indicators are included in an arrangement pattern "AAABBCDDDDD" of the first indicators 161, four kinds of indicators should be included in an arrangement pattern of the second indicators.

According to an arrangement pattern "AAABBCDDDDD" of the first indicators 161, an indicator "A," an indicator "B", an indicator "C" and an indicator "D" are sequentially arranged on a first angle section AP1 between the first angle A1 to the eleventh angle A11. In addition, an indicator "A" is repeated three times, and an indicator "B" is repeated two times. Moreover, an indicator "C" is repeated in one times, and an indicator "D" is repeated five times.

As described above, the first indicators 161 such as an indicator "A," an indicator "B," an indicator "C" and an indicator "D" correspond to angles A1, . . . , A11 of each of first angle section AP1 divided into the first angle gap AG1. In the present exemplary embodiment shown in FIG. 2, since an angle of a screen of the display 110 is about 75 degrees and the screen of the display 110 is divided into ten equal parts to have a first angle gap AG1 of 7.5 degrees, amplitude of the first angle section AP1 is about 75 degrees.

A "repeat ratio" of each indicator in the first indicators 161 is defined as a value that repeating times of each indicators is divided by the total number of indicators within a reference angle section (i.e., a first angle section AP1). For example, as shown in FIGS. 4 and 5, a set of the first indicators 161 includes the total of eleven indicators within the first angle section AP1. In this case, since an indicator "A" is repeated three times, a repeat ratio for the indicator "A" is 3/11.

Since an indicator "B" is repeated two times, a repeat ratio for the indicator "B" is 2/11. Since an indicator "C" is repeated once, a repeat ratio for the indicator "C" is 1/11. Since an indicator "D" is repeated five times, a repeat ratio for the indicator "D" is 5/11. Thus, repeat ratios for the indicators "A", "B", "C" and "D" are 3/11, 2/11, 1/11 and 5/11, respectively.

In order to match with indicators "A", "B", "C" and "D" of the first indicators 161 and the second indicators 162, a second angle section AP2 is selected among arrangement pattern "aabcc . . . hhhhh" of the second indicators 162. It is noted that amplitude of the selected angle section (i.e., the second angle section AP2) is equal to amplitude of the reference angle section (i.e., the first angle section AP1). That is, when amplitude of the reference angle section (i.e., the first angle section AP1) is about 75 degrees, amplitude of the selected angle section (i.e., the second angle section AP2) is about 85 degrees.

In the present exemplary embodiment, since amplitude of the reference angle section (i.e., a first angle section AP1) is about 75 degrees, amplitude of the selection angle section (i.e., a second angle section AP2) is about 85 degrees. As shown in FIG. 3, a set of the second indicators 162 includes a total of forty-eight indicators. The figure of forty-eight corresponds to a value that 360 degrees is divided by 7.5 that is a second angle gap. In the selection angle section (i.e., a second angle section AP2), 10 (i.e., 48×75/360=10) that is the number of indicators corresponding to about 75 degrees among total forty-eight is added by one indicator of a corner, so that second indicators 162 of total eleven are selected.

Since an arrangement pattern "aabcc . . . hhhhh" of the second indicators 162 is repeated in a period of 360 degrees, a start point of the second angle section AP2 may be randomly selected. For example, as shown in FIG. 4, when a start point of the second angle section AP2 is selected as a first map angle MA1 shown in FIG. 3, an arrangement pattern of the second indicators 162 within the selected second angle section AP2 is to be "aabcccccc". Alternatively, as shown in FIG. 5, when a start point of the second angle section AP2 is selected as forty-sixth map angle MA46 shown in FIG. 3, an arrangement pattern of the second indicators 162 within the selected angle section AP2 is to be "hhhaabccccc".

An arrangement pattern "AAABBCDDDDD" of first indicators 161 arranged on the first angle section AP1 and an arrangement pattern (e.g., "aabccccccccc", "abccccccccc", "bccccccccccc",) of second indicators 162 arranged on the selected second angle section AP2 are compared with each other with varying the start point into the second angle gap AG2. In this case, the maximum forty-eight times comparing may be performed until the second indicators 162 matched with the first indicators 161 are extracted with varying the start point into the second angle gap AG2.

A "repeat ratio" of each indicator in the second indicators 162 is defined as a value that repeating times of each indicators is divided by the total number of indicators within the selected angle section (i.e., a second angle section AP2). For example, as shown in FIGS. 4 and 5, a set of the second indicators 162 includes the total of eleven indicators within the second angle section AP2.

As described above, FIG. 4 shows that a start point of the second angle section AP2 is selected as the first map angle MA1 shown in FIG. 3. In a case of FIG. 4, since an indicator "a" is repeated two times, a repeat ratio of the indicator "a" is 2/11. Since an indicator "b" is repeated once, a repeat ratio of the indicator "b" is 1/11. Since an indicator "c" is repeated eight times, a repeat ratio of the indicator "c" is 8/11. Accordingly, in a case of FIG. 4, repeat ratios of the indicators "a", "b" and "c" of the second indicators 162 correspond to 2/11, 1/11 and 8/11, respectively.

Repeat ratios of indicators "A", "B", "C" and "D" arranged on the first angle section AP1 are 3/11, 2/11, 1/11 and 5/11, respectively; however, repeat ratios of indicators "a", "b" and "c" arranged on the second angle section AP2 are 2/11, 1/11 and 8/11, respectively. Moreover, a kind of the first indicators 161 arranged on the first angle section AP1 is four; however, a kind of the second indicators 162 arranged on the second angle section AP2 is three. Thus, it is impossible to match the first indicators 161 to the second indicators 162 having a repeat ratio substantially equal to a repeat ratio of the first indicators 161 in an angle section having equal amplitude (i.e., a first angle section and a second angle section). Namely, the first indicators 161 do not matched with the second indicators 162.

FIG. 5 shows that a start point of the second angle section AP2 is selected as the forty-sixth map angle MA46 shown in FIG. 3. In a case of FIG. 5, since an indicator "h" is repeated three times, a repeat ratio of the indicator "h" is 3/11. Since an indicator "a" is repeated two times, a repeat ratio of the indicator "a" is 2/11. Since an indicator "b" is repeated once, a repeat ratio of the indicator "b" is 1/11. Since an indicator "c" is repeated five times, a repeat ratio of the indicator "c" is 5/11. Accordingly, in a case of FIG. 5, repeat ratios of the indicators "h", "a", "b" and "c" of the second indicators 162 correspond to 3/11, 2/11, 1/11 and 5/11, respectively.

A kind of the first indicators 161 arranged on the first angle section AP1 and a kind of the second angle section AP2 are four. Moreover, repeat ratios of indicator "A", "B", "C" and "D" arranged on the first angle section AP1 are 3/11, 2/11, 1/11 and 5/11, respectively, and repeat ratios of indicators "h", "a", "b" and "c" arranged on the second angle section AP2 are 3/11, 2/11, 1/11 and 5/11, respectively.

Thus, an indicator "A" of first indicators 161 is matched with an indicator "h" of second indicators 162, and an indicator "B" of first indicators 161 is matched with an indicator "a" of second indicators 162. An indicator "C" of first indicators 161 is matched with an indicator "b" of second indicators 162, and an indicator "D" of first indicators 161 is matched with an indicator "c" of second indicators 162 (step S31).

Hereinafter, a method that a real object disposed on an angle corresponding to the matched first indicator 161 is matched with a virtual object having an attribute value as the matched second indicator 162 will be explained.

Referring again to FIGS. 2, 3 and 5, angles corresponding to an indicator "A" of the matched first indicators 161 are a first angle A1, a second angle A2 and a third angle A3 in FIG. 2. Moreover, real objects disposed at the first angle A1, the second angle A2 and the third angle A3 correspond to a first real object 111 of FIG. 2. That is, a real object disposed on an angle corresponding to the matched first indicator "A" is a first real object 111.

Angles corresponding to an indicator "B" of the matched first indicators 161 are a fourth angle A4 and a fifth angle A5 in FIG. 2. Moreover, real objects disposed at the fourth angle A4 and the fifth angle A5 correspond to a second real object 112 of FIG. 2. That is, a real object disposed on an angle corresponding to the matched first indicator "B" is a second real object 112.

Similarly, a real object disposed on an angle corresponding to the matched first indicator "C" is a third real object 113, and a real object disposed on an angle corresponding to the matched first indicator "D" is a fourth real object 114.

A virtual object having an indicator "h" of the matched second indicators 162 as an attribute value is an eighth virtual object 158. A virtual object having an indicator "a" of the matched second indicators 162 as an attribute value is a first virtual object 151. Similarly, a virtual object having an indicator "b" of the matched second indicators 162 as an attribute value is a second virtual object 152, and a virtual object having an indicator "b" of the matched second indicators 162 as an attribute value is a third virtual object 153.

As described above, an indicator "A" of the matched first indicators 161 matches with an indicator "h" of the second indicators 162. A real object disposed on an angle corresponding to the matched first indicator "A" is a first real object 111, and a virtual object having a second indicator "h" matched with the first indicator "A" as an attribute value is an eighth virtual object 158. Thus, a first real object 111 disposed on an angle corresponding to the matched first indicator "A" is matched with an eighth virtual object 158 having a second indicator "h" matched with the first indicator "A" as an attribute value.

An indicator "B" of the matched first indicators 161 matches with an indicator "a" of the second indicators 162. A real object disposed on an angle corresponding to the matched first indicator "B" is a second real object 112, and a virtual object having a second indicator "a" matched with the first indicator "B" as an attribute value is a first virtual object 151. Thus, a second real object 112 disposed on an angle corresponding to the matched first indicator "B" is matched with a first virtual object 151 having a second indicator "a" matched with the first indicator "B" as an attribute value.

Similarly, a third real object 113 disposed on an angle corresponding to the matched first indicator "C" is matched with a second virtual object 152 having a second indicator "b" matched with the first indicator "C" as an attribute value. Moreover, a fourth real object 114 disposed on an angle corresponding to the matched first indicator "D" is matched with a third virtual object 153 having a second indicator "c" matched with the first indicator "D" as an attribute value.

As a result, a step S32 is completed, which matches real objects 111, 112, 113 and 114 respectively disposed on angles corresponding to the matched first indicators "A", "B", "C" and "D" to virtual objects 158, 151, 152 and 153 having second indicators matched with the first indicators as attribute values.

As described above, when the previewed real objects 111, 112, 113, and 114 are matched with virtual objects 158, 151, 152 and 153, attribute values of the real objects 111, 112, 113 and 114 may be determined from attribute values of the virtual objects 158, 151, 152 and 153. That is, it may identify the real objects 111, 112, 113 and 114. Thus, it will be understood that the present invention is related to an object identification method.

For example, the third real object 113 previewed on a central portion of the display 110 is matched with a second virtual object 152 among the virtual objects. Thus, an attribute value such as a position value, an address, a shape, a name, an established year, history, use, a web page address, etc., of the second virtual object 152 matched with the previewed third real object 113 may be used as information.

In an exemplary embodiment, an object identification method according to the present invention may further include a step that an attribute value of a virtual object matched with the previewed real object is outputted to the previewed image. For example, attribute values such as a position value, an address, a shape, a name, an established year, history, use, a web page address, etc., of the second virtual object 152 matched with the previewed third real object 113 may be outputted to an image previewed on the display 110.

According to an object identification method of the present invention, it may identify a direction PVD previewing the third real object 113. For example, a sixth angle A6 corresponding to a third real object 113 disposed on a central portion of the display 110 in FIG. 2 correspond to a direction PVD previewing the third real object 113. However, an indicator "C" corresponding to the sixth angle A6 matches with an indicator "b" on a map data, so that it may know that the sixth angle A6 correspond to a third map angle MA3 on the map data. Since the third map angle MA3 is a direction rotating by about 15 degrees (i.e., 7.52=15) from due north in a clockwise direction in FIG. 3, it may be known that a direction PVD previewing the third real object 113 is a direction rotating by about 15 degrees from due north in a clockwise direction.

Accordingly, by using an object identification method according to the present invention, a direction previewing a real object may be identified without a direction sensor or a compass. Moreover, a display device or a terminal which uses an object identification method according to the present invention may perform a role of a digital compass without a direction sensor. That is, an exemplary embodiment of the present invention is related to a digital compass which outputs an azimuth value of a virtual object matching with the previewed real object as an azimuth value of a direction previewing the real object. Moreover, an object identification method or an object identification system according to the present invention may be employed to a terminal having a direction sensor. In this case, in order to more accurate identify an object, the object identification method or the object identification system may perform a function of complementing a function of the direction sensor.

In the present exemplary embodiment, the first angle gap AG1 and the second angle gap AG2 are set as about 7.5 degrees; however, it may be preferred to narrow an interval between the first angle gap AG1 dividing the first angle section AP1 and the second angle gap AG2 dividing the map data. That is, when the first angle gap AG1 and the second angle gap AG2 are narrowed, it may reduce an error.

In the present exemplary embodiment, it is described that the first angle gap AG1 and the second angle gap AG2 are equal to each other; however, it is not limited thereto. For example, the first angle gap AG1 is set integer times of the second angle gap AG2. Alternatively, the second angle gap AG2 is set integer times of the first angle gap AG1. That is, the first angle gap may be n times ('n' is an integer) or 1/n times of the second angle gap.

When the first angle gap AG1 is set in n times ('n' is an integer) of the second angle gap AG2, the number of the second indicators 162 is n times greater than the number of the first indicators 161. However, when the first indicator 161 and the second indicators 162 are matched with each other in the first angle section AP1 and the second angle section AP2, a repeat ratio of the first indicators 161 may be substantially equal to a repeat ratio of the second indicators 162. Similarly, when the first angle gap AG1 is set in 1/n times of the second angle gap AG2, the number of the first indicators 161 is n times greater than the number of the second indicators 162. However, when the first indicator 161 and the second indicators 162 are matched with each other in the first angle section AP1 and the second angle section AP2, a repeat ratio of the first indicators 161 may be substantially equal to a repeat ratio of the second indicators 162.

In an exemplary embodiment, an object identification method according to the present invention is produced as a software program used in a digital device such as an object identification system, a wireless internet system, a server computer providing an object identification service or an augmented reality service, a portable telephone, a smart phone, a PDA, etc., to be stored in an information write medium.

For example, an objection identification method according to the present invention may be used in a program for identifying an object used in a terminal such as a portable telephone, a smart phone, a PDA, etc., and an application program such as an augmented reality executing program, a wireless internet browser, etc. The application program using the objection identification method may be stored in an information write medium such as memory embedded in a terminal such as a portable telephone, a smart phone, a PDA, etc. That is, a claim scope of objection identification method according to the present invention may include an information write medium storing an application program of a digital device such as the terminal.

Moreover, an object identification method according to the present invention may be realized by using an object identification system which will be explained with reference to FIGS. 6 to 10.

According to the present invention, although a terminal does not include a direction sensor or a distance sensor, the terminal may identify a real object. Moreover, although a server does not secure image data of large capacity in advance, a terminal may identify a real object. Furthermore, since a terminal may identify a direction previewing a real object without an additional direction sensor, the present invention may be employed to a terminal not having a direction sensor. Moreover, the present invention may complement a function of the direction sensor.

Exemplary Embodiment 2

Figure 6:
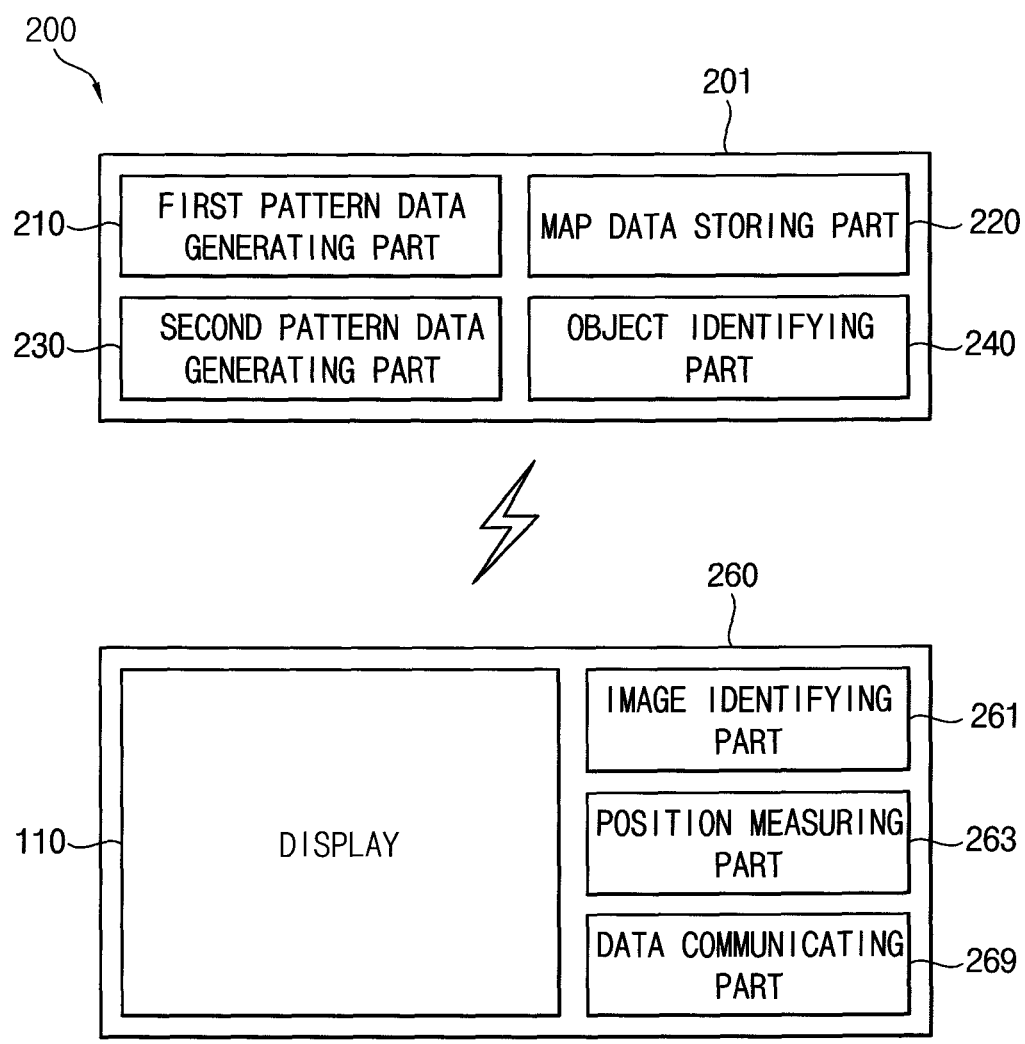
FIG. 6 is a block diagram showing an object identification system according to Exemplary Embodiment 2 of the present invention.
Figure 7:
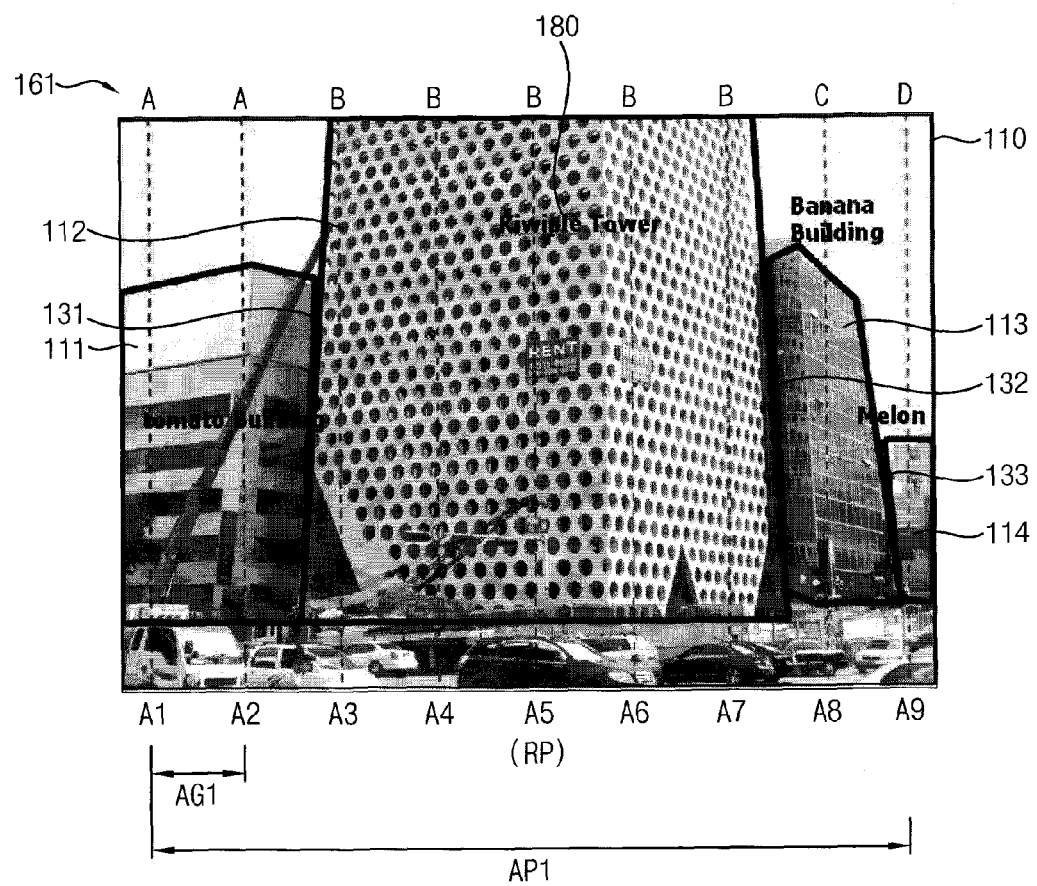
FIG. 7 is a plan view showing a display screen employing an object identification system shown in FIG. 6.
Figure 8:
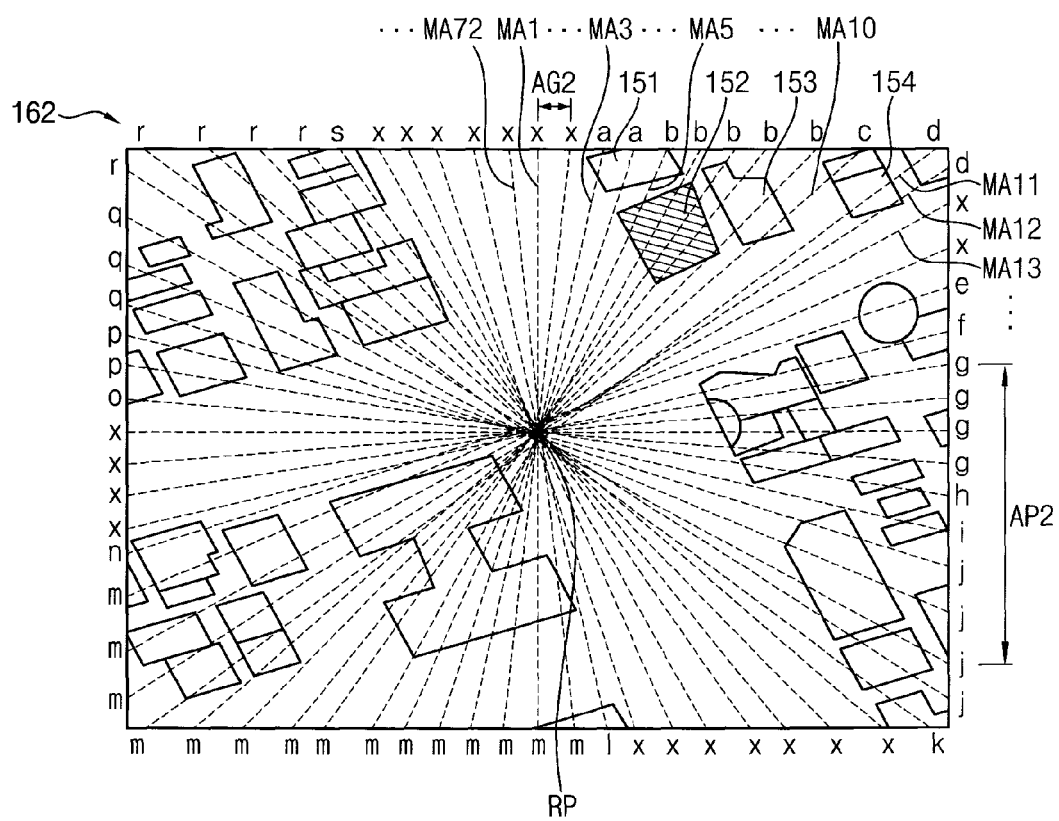
FIG. 8 is a plan view showing a map data employing an object identification system shown in FIG. 6.

FIG. 6 is a block diagram showing an object identification system according to Exemplary Embodiment 2 of the present invention. FIG. 7 is a plan view showing a display screen employing an object identification system shown in FIG. 6. FIG. 8 is a plan view showing a map data employing an object identification system shown in FIG. 6.

An object identification method used in an object identification system according to Exemplary Embodiment 1 of the present invention shown in FIGS. 6 to 8 is substantially the same as the object identification method according to Exemplary Embodiment 1 reference to FIGS. 1 to 5, and thus any repetitive detailed explanation will be omitted. Likewise, the same reference characters refer to the same or like components.

Referring to FIG. 6, an object identification system 200 according to Exemplary Embodiment 2 of the present invention includes a first pattern data generating part 210, a map data storing part 220, a second pattern data generating part 230 and an object identifying part 240.

The object identification system 200 may wireless communicate with an external mobile terminal 260. As an example, the mobile terminal 260 may be a portable telephone, a smart phone, a PDA, a digital video camera, etc.

The mobile terminal 260 may include a display 110 displaying an image, an image identifying part 261 identifying an image of real object, a position measuring part 263 generating a position value and a data communicating part 269 for communicating with the object identifying part 240.

The image identification part 261 may include, for example, a camera converting a real image into a digital image data. An image identified by the image identification part 261 may be displayed on the display 110 in a real time.

The position measuring part 263 generates a current position value of a mobile terminal 260. For example, the position measuring part 263 may include a GPS receiver capable of communicating with a GPS satellite. That is, the position measuring part 263 of the mobile terminal 260 may generate a position value of the mobile terminal 260 that is a portion of a real object identification data by using the GPS receiver. Alternatively, the position measuring part 263 may generate a position value of the mobile terminal 260 by measuring a distance between the mobile terminal 260 and a base station such as a wireless local area network access point (WLAN AP) or a distance between the mobile terminal 260 and a repeater.

Referring to FIGS. 6 and 7, the first pattern data generating part 210 divides a first angle section AP1 corresponding to images of the previewed real objects 111, 112, 113 and 114 into a first angle gap AG1 which is uniform with respect to a position RP where the real objects 111, 112, 113 and 114 are previewed.

A position RP previewing the real objects 111, 112, 113 and 114 may correspond to a position of the mobile terminal 260 including a display 110 in a real space. When the first angle gap AG1 is X degrees, a real space is divided into 360/X spaces with respect to the previewing position RP. In an exemplary embodiment shown in FIG. 7, the second angle gap AG1 is divided to have five degrees.

The first pattern data generating part 210 calculates boundaries 131, 132 and 133 between the real objects 111, 112, 113 and 114 from images of the real objects 111, 112, 113 and 114. As described with reference to FIG. 2, boundaries between the real objects 131, 132 and 133 may be calculated by adapting an image edge detection method into the images of the real objects 111, 112, 113 and 114. The image edge detection method is described refer to FIG. 2, a detailed description or algorithm for the edge detection method is described in various theses or literatures including textbook related to a digital image processing, and thus a detailed description will be omitted.

The first pattern data generating part 210 generates first indicators 161 by using each angles (e.g., A1, . . . , A9 of FIG. 7) of a first angle section AP1 divided into the first angle gap AG1 and positions of boundaries 131, 132 and 133 between the calculated real objects 111, 112, 113 and 114. The first indicators 161 correspond to each angle A1, . . . , A9 of the first angle section AP1 divided into the first angle gap AG1, and vary every boundary 131, 132 and 133 between the calculated real objects 111, 112, 113 and 114. For example, the first indicators 161 corresponding to each angles A1, . . . , A9 of the first angle section AP1 divided into the first angle gap AG1 to be varied every boundary between the calculated real objects 111, 112, 113 and 114 may have an arrangement pattern of "AABBBBBCD". Hereinafter, a pattern data configured in a set of the first indicators 161 is defined as a first pattern data "AABBBBBCD." That is, the first pattern data generating part 210 generates the first pattern data "AABBBBBCD."

Referring to FIGS. 6 and 8, the map data storing part 220 includes map data including virtual objects having a second indicator 162 and an outline data as an attribute value.

The map data includes virtual object of which positions are fixed such as a virtual building, a virtual bronze statue, a virtual sculpture, a virtual nature matter, etc., and each of the virtual objects has an attribute value such as an indicator, a position value and an outline data. The attribute value of the virtual object may further include information related to the virtual object. For example, the attribute value of the virtual object may further include various information such as a title of the virtual object, an established year of the virtual object, history of the virtual object, height of the virtual object, an address of the virtual object, a web page address of the virtual object, a position value of the virtual object, a shape of the virtual object, use of the virtual object, an age of tree, a kind of tree, etc.

A term "indicator" (i.e., a second indicator) of the virtual object means unique attributes of each virtual object different from another virtual object. For example, when a virtual object is a building, a name of the building or an address of the building may be the second indicator. Alternatively, a predetermined code is set every the virtual building, and the predetermined code may be used as the second indicator.

In the present exemplary embodiment, the virtual objects include a first virtual object 151 to fourth virtual object 154. The map data further includes virtual objects; however, it will be understood that reference numerals for the first to fourth virtual objects 151, 152, 153 and 154 are represented. The virtual objects respectively include an indicator (i.e., a second indicator). For example, it is assumed that a second indicator 162 of the first virtual object 151 is "a" and a second indicator 162 of the second virtual object 152 is "b." Moreover, it is assumed that a second indicator 162 of the third virtual object 153 is "c" and a second indicator 162 of the fourth virtual object 154 is "b."

When a virtual object having an outline firstly meet with a radiating line corresponding to the map angle does non-exist within a radius of the circle shape map corresponding to a target analysis area, a virtual object does not extracted. In this case, since a virtual object corresponding to the map angle is non-exist, a second indicator 162 corresponding to the map angle may be calculated as "x." In FIG. 3, for a map angle in which a virtual object having an outline firstly meet with a radiating line is non-exist, a second indicator 162 is marked as "x". As described above, a radius of a circle map corresponds to a distance which is required by an object identification system, and a virtual object for all angle may be exist when the radius of a circle map is set to be longer. In this case, it will be understood that a second indicator 162 is not calculated as "x."

The virtual objects of the map data have an outline data as an attribute value. The outline data means data for representing an outline shape of a virtual object on a map. The outline data may be data related to a two-dimensional shape of a virtual object. Alternatively, the outline data may be data related to a three-dimensional shape.

For example, when the outline data is data for representing a plan shape of a virtual object, the outline data may include position values of corners of the virtual object. In this case, a straight line connecting positions of neighboring corners of each of the virtual objects is drawn on the map data by using position values of corners of the virtual object, so that outlines of each of the virtual objects may be drawn on the map data.

Alternatively, the outline data may include a position value of the virtual object and relative position values between corners of the virtual object and the position value of the virtual object. For example, the outline data may include a relative position value such as a distance between the corner position and the virtual object position and a direction instead of absolute values of the corners. In this case, positions of each corners of the object may be calculated by a position value of the virtual object and relative position values of the corners. When a straight line connecting adjacent corner positions of each of the virtual objects is drawing on the map data, an outline of each of the virtual objects may be drawn on the map data.

The second pattern data generating part 230 divides the map data into a second angle gap which is uniform with respect to a position where the real objects are previewed, extracts a virtual object having an outline firstly meet with a radiating line corresponding to each map angle of the divided into the second angle gap, and generates a second pattern data configured as a set of the second indicators corresponding to each of the map angles.

In one exemplary embodiment, the second pattern data generating part 230 divides the map data into a second angle gap AG2 which is uniform with respect to the previewing position RP. When the second angle gap AG2 is about X degrees, a virtual space of the map data is divided into 360/X spaces with respect to the previewing position RP. In FIG. 8, it is assumed that the second angle gap AG2 is about 5 degrees. In this case, a virtual space of the map data is divided into seventy-two equal parts (i.e., 360/5=72) with respect to the previewing position RP. For example, it is assumed that each angles divided into seventy-two equal parts of the map data with respect to due north on a map data are a first map angle MA1 to a seventy-second map angle MA72.

Virtual radiating lines (shown as a dot line) are assumed, which correspond to each map angles MA1, ..., MA72 of the map data divided into the second angle gap AG2 with respect to a previewing position RP. In this case, the second pattern data generating part 230 extracts a virtual object having an outline firstly meet with a radiating line corresponding to each of the map angles MA1, ..., MA72 from the map data. As described above, since virtual objects extracted in correspondence with each of the map angles MA1, ..., MA72 include corresponding second indicators 162 as an attribute value, a set of the second indicators 162 corresponding to each of the map angles MA1, ..., MA72 may be calculated from the extracted virtual objects For example, since a virtual object extracted in correspondence with the first map angle MA1 and the seventy-second map angle MA72, a second indicator 162 corresponding to the first map angle MA1 and the seventy-second map angle MA72 is calculated as "x".

A virtual object extracted in correspondence with the third map angle MA3 is a first virtual object 151, and the first virtual object 151 includes "a" as a second indicator 162. Thus, a second indicator 162 corresponding to the third map angle MA3 is calculated as "a." A virtual object extracted in correspondence with the fifth map angle MA5 is a second virtual object 152, and the second virtual object 152 includes "b" as a second indicator 162. Thus, a second indicator 162 corresponding to the fifth map angle MA5 is calculated as "b."

A virtual object extracted in correspondence with the tenth map angle MA10 is a third virtual object 153, and the third virtual object 153 includes "c" as a second indicator 162. Thus, a second indicator 162 corresponding to the tenth map angle MA10 is calculated as "c." Moreover, a virtual object extracted in correspondence with the eleventh map angle MA11 is a fourth virtual object 154, and the fourth virtual object 154 includes "d" as a second indicator 162. Thus, a second indicator 162 corresponding to the eleventh map angle MA11 is calculated as "d."

A set of the second indicators 162 calculated through the method may have an arrangement pattern such as "xxaab ... xxxxx." Hereinafter, pattern data configured as a set of the second indicators 162 is defined as a second pattern data "xxaab ... xxxxx." That is, the second pattern data generating part 230 generates the second pattern data "xxaab ... xxxxx."

In the present exemplary embodiment, it is described that the first angle gap AG1 and the second angle gap AG2 are equal to each other; however, it is not limited thereto. For example, the first angle gap AG1 is set integer times of the second angle gap AG2. Alternatively, the second angle gap AG2 is set integer times of the first angle gap AG1. That is, the first angle gap may be n times ('n' is an integer) or 1/n times of the second angle gap.

The object identifying part 240 compares with a first arrangement pattern of first indicators arranged on the first angle section and an arrangement pattern of second indicators arranged on the second angle section having an amplitude substantially equal to the first angle section, and matches the first indicators with the second indicators having a repeat ratio substantially equal to that of the first indicators in an angle section having equal amplitude.

A term "matching with a first indicator 161 and a second indicator 162" means that a first indicator 161 such as an indicator "A", an indicator "B", an indicator "C", an indicator "D", etc., is coupled with the second indicators 162 such as an indicator "a", an indicator "b", an indicator "c", ..., an indicator "r", an indicator "s", etc., as explained with reference to FIGS. 2 to 5.

A "repeat ratio" of each indicator in the first indicators 161 is defined as a value that repeating times of each indicators is divided by the total number of indicators within a reference angle section (i.e., a first angle section AP1). For example, a set of the first indicators 161 includes the total of nine indicators within the first angle section AP1 of FIG. 7. Amplitude of the first angle section AP1 is 40 degrees (5×8).

In this case, a repeat ratio for the indicator "A" is 2/9 since the indicator "A" is repeated two times, and a repeat ratio for the indicator "B" is 5/9 since the indicator "B" is repeated five times. Moreover, a repeat ratio for the indicator "C" is 1/9 since the indicator "C" is repeated once, and a repeat ratio for the indicator "D" is 1/9 since the indicator "D" is repeated once. Accordingly, repeat ratios of the indicators "A", "B", "C" and "D" correspond to 2/9, 5/9, 1/9 and 1/9, respectively.

In order to match with indicators "A", "B", "C" and "D" of the first indicators 161 and the second indicators 162, a second angle section AP2 is selected among arrangement pattern "aabcc ... hhhhh" of the second indicators 162. It is noted that amplitude of the selected angle section (i.e., the second angle section AP2) is equal to amplitude of the reference angle section (i.e., the first angle section AP1). That is, when amplitude of the reference angle section (i.e., the first angle section AP1) is about 40 degrees, amplitude of the selected angle section (i.e., the second angle section AP2) is about 40 degrees.

Since an arrangement pattern "aabcc . . . hhhhh" of the second indicators 162 is repeated in a period of 360 degrees, a start point of the second angle section AP2 may be randomly selected. An arrangement pattern "AABBBBBCD" of first indicators 161 arranged on the first angle section AP1 and an arrangement pattern (e.g., "xxaabbbbb", "xaabbbbbc", "aabbbbbcd", etc.) of second indicators 162 arranged on the selected second angle section AP2 are compared with each other with varying the start point into the second angle gap AG2. In this case, the maximum seventy-two times (i.e., 360/5=72) comparing may be performed until the second indicators 162 matched with the first indicators 161 are extracted with varying the start point into the second angle gap AG2.

A "repeat ratio" of each indicator in the second indicators 162 is defined as a value that repeating times of each indicators is divided by the total number of indicators within the selected angle section (i.e., a second angle section AP2). For example, as shown in FIG. 8, a set of the second indicators 162 includes the total of nine indicators within the second angle section AP2.

When a start point of the second angle section AP2 is selected as a third map angle MA3, an arrangement pattern of the second indicators 162 within the selected second angle section AP2 is to be "aabbbbbcd". In this case, since an indicator "a" is repeated two times, a repeat ratio of the indicator "a" is 2/9. Since an indicator "b" is repeated five times, a repeat ratio of the indicator "b" is 5/9. Since an indicator "c" is repeated once, a repeat ratio of the indicator "c" is 1/9. Since an indicator "d" is repeated once, a repeat ratio of the indicator "d" is 1/9.

Accordingly, repeat ratios of the indicators "a", "b" and "c" of the second indicators 162 correspond to 2/9, 5/9, 1/9 and 1/9, respectively.

Repeat ratios of indicators "A", "B", "C" and "D" arranged on the first angle section AP1 are 2/9, 5/9, 1/9 and 1/9, respectively, and repeat ratios of indicators "a", "b", "c" and "d" arranged on the second angle section AP2 are 2/9, 5/9, 1/9 and 1/9, respectively. Thus, an indicator "A" of first indicators 161 is matched with an indicator "a" of second indicators 162, and an indicator "B" of first indicators 161 is matched with an indicator "b" of second indicators 162. An indicator "C" of first indicators 161 is matched with an indicator "c" of second indicators 162, and an indicator "D" of first indicators 161 is matched with an indicator "d" of second indicators 162.

The object identifying part 240 matches a real object disposed on an angle corresponding to the matched indicator 161 and a virtual object having the matched second indicator 162 as an attribute value, and extracts virtual objects of the map data matched with the previewed real objects.

For example, angles corresponding to indicator "A" of the matched first indicators 161 are a first angle A1 and a second angle A2 in FIG. 7. A real object disposed on an angle corresponding to the matched first indicator "A" is a first real object 111. An indicator "A" of the matched first indicators 161 is matched with an indicator "a" of the second indicators 162. A virtual object having an indicator "a" of the matched second indicators 162 as an attribute value is a first virtual object 151. Thus, a first real object 111 disposed on an angle corresponding to the matched first indicator "A" is matched with a first virtual object 151 having a second indicator "a" matching with the first indicator "A" as an attribute value.

Similarly, a second real object 112 disposed on an angle corresponding to the matched first indicator "B" is matched with a second virtual object 152 having a second indicator "b" matching with the first indicator "B" as an attribute value, and a third real object 113 disposed on an angle corresponding to the matched first indicator "C" is matched with a third virtual object 153 having a second indicator "c" matching with the first indicator "C" as an attribute value. Moreover, a fourth real object 114 disposed on an angle corresponding to the matched first indicator "D" is matched with a fourth virtual object 154 having a second indicator "d" matching with the first indicator "D" as an attribute value.

The object identifying part 240 matches a first real object 111 disposed on an angle corresponding to the matched first indicator "A" with a first virtual object 151 having a second indicator "a" matching with the first indicator as an attribute value, and extracts a first virtual object 151 of the map data matching with the previewed first real object 111.

Similarly, the object identifying part 240 extracts a second virtual object 152 of the map data matching with the previewed second real object 112, and extracts a third virtual object 153 of the map data matching with the previewed third real object 113. Similarly, the object identifying part 240 extracts a fourth virtual object 154 of the map data matching with the previewed fourth real object 114.

As a result, the object identifying part 240 matches real objects 111, 112, 113 and 114 respectively disposed on angles corresponding to the matched first indicators "A", "B", "C" and "D" with virtual objects 151, 152, 153 and 154 having second indicators matching with the first indicators, respectively, and extracts virtual objects 151, 152, 153 and 154 matching with the previewed real objects 111, 112, 113 and 114, respectively.

In an exemplary embodiment shown in FIG. 6, the first pattern data generating part 210, the map data storing part 220, the second pattern data generating part 230 and the object identifying part 240 of the object identification system 200 may be provided with a server computer 201. That is, the server computer 201 may handle an information process for identifying an object.

The server computer 201 may receive an image of the previewed real objects from a mobile terminal 260 and a position value of the mobile terminal. In this case, the position value of the mobile terminal 260 may correspond to a position previewing the real objects. The position value of the mobile terminal 260 may be generated by a position measuring part 263 of the mobile terminal 260.

As described above, a position value of the mobile terminal 260 may be generated by a GPS receiver capable of communicating with a GPS satellite. Alternatively, the position value of the mobile terminal 260 may be generated by measuring a distance between the mobile terminal 260 and a base station such as a wireless local area network access point (WLAN AP) or a distance between the mobile terminal 260 and a repeater.

In an exemplary embodiment, the server computer 201 may transmit an attribute value matching with the previewed real object to the mobile terminal 260. As described above, the attribute value of a virtual object means information such as a position value, an address, a shape, a height, a name, a related web page address, an established year of building or sculpture, history of building or sculpture, use of building or sculpture, an age of tree, a kind of tree, etc., storable in an information write medium as a database.

In an exemplary embodiment, the mobile terminal 260 may display the attribute value transmitted from the server computer 201 on a display 110 of a mobile terminal 260. For example, as shown in FIG. 7, the attribute value of the virtual object may be a name of a building such as "Kiwiple Tower."

That is, the server computer 201 transmits the building name 180 that is an attribute value of a virtual object matching with the previewed second real object 112 to the mobile terminal 260, and the mobile terminal 260 may display the building name 180 transmitted from the server computer 201 on a display 110.

The server computer 201 and the mobile terminal 260 may be used in a wireless internet system. For example, the server computer 201 may be used as a server computer for wireless internet which identify a virtual object matching with a previewed object by using an object identification system and transmit an attribute value 180 including the identified virtual object to a mobile terminal 260.

Exemplary Embodiment 3

Figure 9:
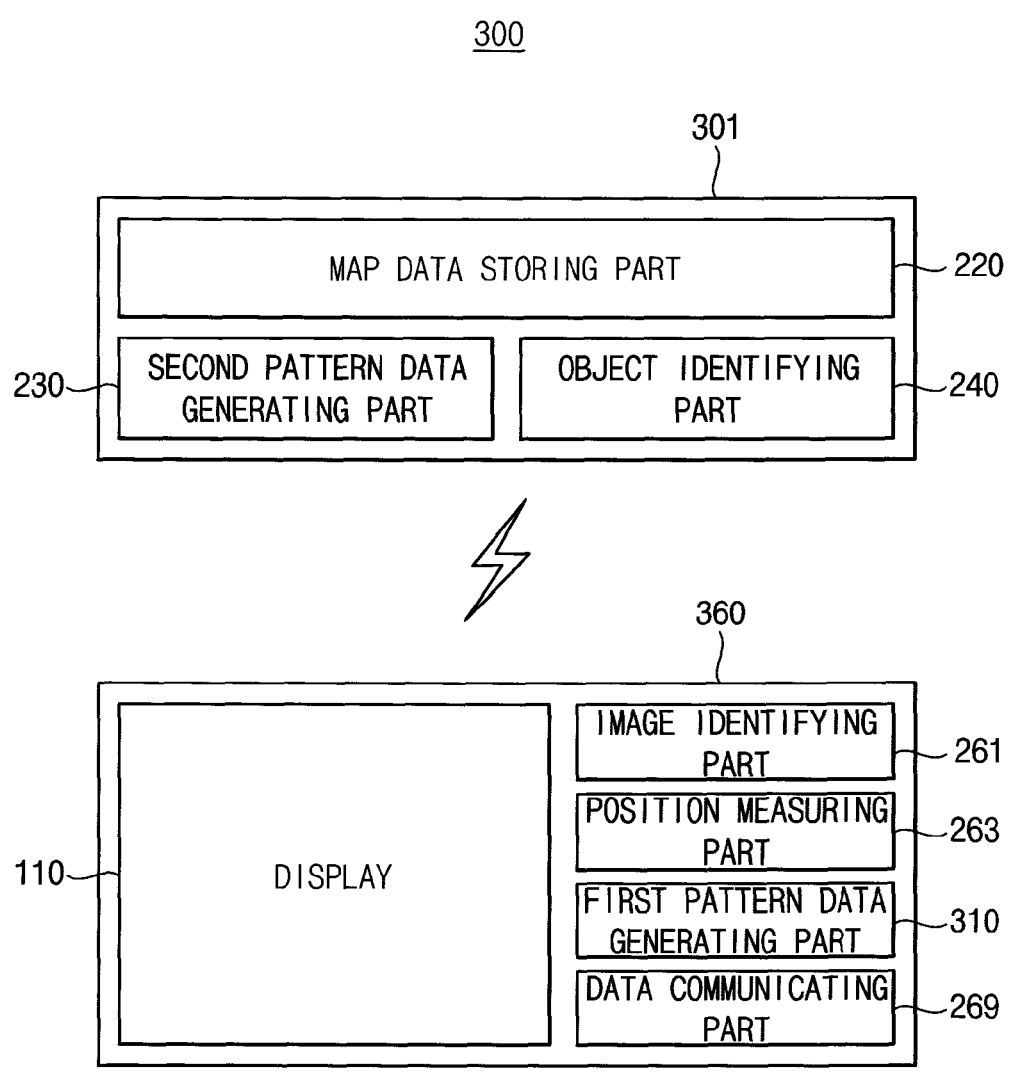
FIG. 9 is a block diagram showing an object identification system according to Exemplary Embodiment 3 of the present invention.

FIG. 9 is a block diagram showing an object identification system according to Exemplary Embodiment 3 of the present invention.

An object identification system according to Exemplary Embodiment 3 of the present invention shown in FIG. 9 is substantially the same as the object identification system according to Exemplary Embodiment 2 reference to FIG. 6 except for at least that a first pattern data generating part is included in a mobile terminal, and an object identification method used in an object identification system according to Exemplary Embodiment 3 is substantially the same as the object identification method according to Exemplary Embodiment 1 reference to FIGS. 1 to 5. Thus, any repetitive detailed explanation will be omitted, and the same reference characters will be used to refer to the same or like components.

Referring to FIG. 9, an object identification system 300 according to Exemplary Embodiment 3 of the present invention includes a first pattern data generating part 310, a map data storing part 220, a second pattern data generating part 230 and an object identifying part 240. In the object identification system 300 according to Exemplary Embodiment 3, the first pattern data generating part 310 is included in a mobile terminal 360, and the second pattern data generating part 230 and the object identifying part 240 are included in a server computer 301. That is, the mobile terminal 360 includes the first pattern data generating part 310.

The mobile terminal 360 may further include a display 110 displaying an image, an image identifying part 261 identifying an image of a real object, a position measuring part 263 generating a position value of the mobile terminal 360 and a data communicating part 269 for communicating with the object identifying part 240.

The first pattern data generating part 310 of the mobile terminal 360 divides a first angle section corresponding to images of previewed real objects into a first angle gap which is uniform with respect to a position where the real objects are previewed, calculates boundaries between the real objects from images of the real objects, and generates a first pattern data configured by set of first indicators which corresponds to each angles of the first angle section divided into the first angle gap and which varies every boundary between the calculated real objects.

The first pattern data generating part 310 is substantially the same as the first pattern data generating part 210 of FIG. 6 except for at least the first pattern data generating part 310 is included in the mobile terminal 360 not the server computer 301, and a method of generating the first indicator set is described above refer to FIG. 2. Thus, any repetitive detailed explanation will be omitted.

According to Exemplary Embodiment 3 of the present invention, the first pattern data generating part 310 of the mobile terminal 360 generates the first pattern, not that an image identified by the image identification part 261 of the mobile terminal 360 is included in the server computer 301 to generate the first pattern data including the first indicators set.

The first pattern data generated in the first pattern data generating part 310 of the mobile terminal 360 may be transmitted to the server computer 301 through a data communicating part 269.

The server computer 301 includes a map data storing part 220, a second pattern data generating part 230 and an object identifying part 240.

The server computer 301 receives a position value of the mobile terminal 360 and the first pattern data generated in a first pattern data generating part 310 of the mobile terminal from the mobile terminal. The position value of the mobile terminal 360 may correspond to a position previewing the real objects. The position value of the mobile 360 may be generated by a position measuring part 63 of the mobile terminal 360.

As described above, a position value of the mobile terminal 360 may be generated by a GPS receiver capable of communicating with a GPS satellite. Alternatively, the position value of the mobile terminal 360 may be generated by measuring a distance between the mobile terminal 360 and a base station such as a wireless local area network access point (WLAN AP) or a distance between the mobile terminal 360 and a repeater.

The map data storing part 220 stores a map data including virtual objects having a second indicator 162 and an outline data as an attribute value. The map data storing part 220 is substantially the same as the map data storing part 220 explained refer to FIG. 6, and thus any repetitive detailed explanation will be omitted.

The second pattern data generating part 230 divides the map data into a second angle gap which is uniform with respect to a position where the real objects are previewed, extracts a virtual object having an outline firstly meet with a radiating line corresponding to each map angle of the divided into the second angle gap, and generates a second pattern data configured as a set of the second indicators corresponding to each of the map angles. The second pattern data generating part 230 is substantially the same as the second pattern data generating part 230 of FIG. 6, and a method of generating the second indicator set is described above refer to FIG. 3. Thus, any repetitive detailed explanation will be omitted.

The object identifying part 240 extracts virtual objects respectively matched with the previewed real objects by using first indicators of a first pattern data transmitted from the mobile terminal 360 and second indicators of a second pattern data generated by the second pattern data generating part 230. The object identifying part 240 is substantially the same as the object identifying part 240 of FIG. 6, and thus any repetitive detailed explanation will be omitted. Moreover, a method of matching the first indicators with second indicators having a repeat ratio equal to that of the first indicators in an angle section of equal amplitude, and a method of matching a real object disposed on an angle corresponding to the matched first indicator with a virtual object having a second indicator matching with the first indicator as an attribute value with a real object disposed on an angle corresponding to the matched first indicator are described above refer to FIGS. 2, 3 and 5. Thus, any repetitive detailed explanation will be omitted.

According to Exemplary Embodiment 3, the server computer 301 receives a position value of the mobile terminal 360 from the mobile terminal 360 and the first pattern data generated by the first pattern data generating part 310 of the mobile terminal 360, and extracts virtual objects respectively matching with the previewed real objects. Thus, the server computer 301 is not required to receive an image data from the mobile terminal 360.

Generally, since image data has a relatively large capacity such as dozens of kilobytes (kB) to hundreds of kilobytes (kB). Thus, when the mobile terminal 360 transmits image data to the server computer 301 every times, a data transmitting efficiency is reduced. However, the first pattern data has a relatively small capacity such as a few of bytes (B) to dozens of kilobytes (kB).

According to Exemplary Embodiment 3, since the server computer 301 receives a first pattern data of a relatively small capacity instead of image data from the terminal 360, it may increase data transmitting efficiency between the server computer 301 and the terminal 360.

The server computer 301 and the mobile terminal 360 may be used in a wireless internet system. For example, the server computer 301 may be used as a server computer for wireless internet which identify a virtual object matching with a previewed object by using an object identification system and transmit an attribute value 180 including the identified virtual object to a mobile terminal 360.

Exemplary Embodiment 4

Figure 10:
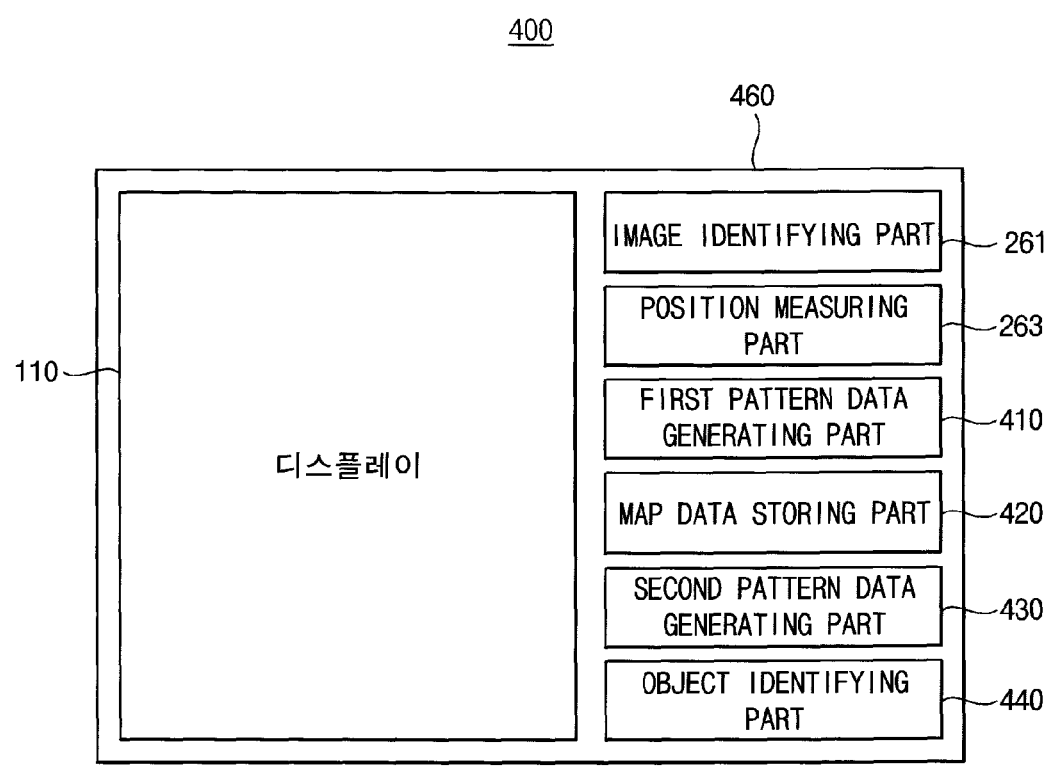
FIG. 10 is a block diagram showing an object identification system according to Exemplary Embodiment 4 of the present invention.

FIG. 10 is a block diagram showing an object identification system according to Exemplary Embodiment 4 of the present invention.

An object identification system according to Exemplary Embodiment 4 of FIG. 10 is substantially the same as the object identification system according to Exemplary Embodiment 2 with reference to FIG. 6 and the object identification system according to Exemplary Embodiment 3 with reference to FIG. 7 except for at least a first pattern generating part, a map data storing part, a second pattern data generating part and an object identifying part are included in a mobile terminal, and an object identification method used in an object identification system according to Exemplary Embodiment 4 is substantially the same as the object identification method according to Exemplary Embodiment 1 reference to FIGS. 1 to 5. Thus, any repetitive detailed explanation will be omitted. Likewise, the same reference characters refer to the same or like components.

Referring to FIG. 10, an object identification system 400 according to Exemplary Embodiment 3 of the present invention includes a first pattern data generating part 410, a map data storing part 420, a second pattern data generating party 430 and an object identifying part 440. In the object identification system 400, the first pattern data generating part 410, the map data storing part 420, the second pattern data generating party 430 and the object identifying part 440 may be included in a mobile terminal 460.

The first pattern data generating part 410 divides a first angle section corresponding to images of previewed real objects into a first angle gap which is uniform with respect to a position where the real objects are previewed, calculates boundaries between the real objects from images of the real objects, and generates a first pattern data configured by set of first indicators which corresponds to each angles of the first angle section divided into the first angle gap and which varies every boundary between the calculated real objects.

The first pattern data generating part 410 is substantially the same as the first pattern data generating part 210 of FIG. 6 except for at least the first pattern data generating part 410 is included in the mobile terminal 460, and a method of generating the first indicator set is described above refer to FIG. 2. Thus, any repetitive detailed explanation will be omitted.

The map data storing part 420 stores a map data including virtual objects having a second indicator 162 and an outline data as an attribute value. The map data storing part 420 is substantially the same as the map data storing part 220 explained refer to FIG. 6 except for at least that the map data storing part 420 is included in the mobile terminal 460, and thus any repetitive detailed explanation will be omitted.

The second pattern data generating part 430 divides the map data into a second angle gap which is uniform with respect to a position where the real objects are previewed, extracts a virtual object having an outline firstly meet with a radiating line corresponding to each map angle of the divided into the second angle gap, and generates a second pattern data configured as a set of the second indicators corresponding to each of the map angles. The second pattern data generating part 430 is substantially the same as the second pattern data generating part 230 of FIG. 6 except for at least that the second pattern data generating part 430 is included in the mobile terminal 460, and a method of generating the second indicator set is described above refer to FIG. 3. Thus, any repetitive detailed explanation will be omitted.

The object identifying part 440 extracts virtual objects matching with the previewed real objects by using the first indicators of the first pattern data and the second indicators of the second pattern data. The object identifying part 440 is substantially the same that the object identifying part 440 of FIG. 6 except for at least being included in the mobile terminal 460, and thus any repetitive detailed explanation will be omitted. Moreover, a method of matching the first indicators with second indicators having a repeat ratio equal to that of the first indicators in an angle section of equal amplitude, and a method of matching a real object disposed on an angle corresponding to the matched first indicator with a virtual object having a second indicator matching with the first indicator as an attribute value with a real object disposed on an angle corresponding to the matched first indicator are described above refer to FIGS. 2, 3 and 5. Thus, any repetitive detailed explanation will be omitted.

The mobile terminal 460 may further include a display 110 displaying an image, an image identification part 261 identifying an image of a real object and a position measuring part 263 generating a position value of the mobile terminal 460.

The image identification part 261 may include, for example, a camera converting a real image into a digital image data. An image identified by the image identification part 261 may be displayed on the display 110 in a real time.

The position measuring part 263 generates a current position value of a mobile terminal 260. For example, the position measuring part 263 may include a GPS receiver capable of communicating with a GPS satellite. That is, the position measuring part 263 of the mobile terminal 260 may generate a position value of the mobile terminal 260 that is a portion of a real object identification data by using the GPS receiver. Alternatively, the position measuring part 263 may generate a position value of the mobile terminal 260 by measuring a distance between the mobile terminal 260 and a base station such as a wireless local area network access point (WLAN AP) or a distance between the mobile terminal 260 and a repeater.

The mobile terminal 460 may display an attribute value matching with the previewed real object on a display 110 of the mobile terminal 460. As described above, the attribute value of a virtual object means information such as a position value, an address, a shape, a height, a name, a related web page address, an established year of building or sculpture, history of building or sculpture, use of building or sculpture, an age of tree, a kind of tree, etc., storable in an information write medium as a database.

As an example, the mobile terminal 460 using an object identification system according to the present invention or including may be a portable digital device such as a portable telephone, a smart phone, a PDA, a digital video camera, etc.

According to an exemplary embodiment of the present invention, it may identify a direction previewing the second real object 112. For example, a fifth angle A5 corresponding to the second real object 112 disposed at a center of the display 110 corresponds to a direction previewing the second real object 112. Since an indicator "B" corresponding to the fifth angle A5 is matched with an indicator "b" on a map data, it may be known that the fifth angle A5 corresponds to a seventh map angle MA7 on the map data. Since the seventh map angle MA7 is a direction rotating by about 35 degrees (i.e., 5*7=35) from due north in a clockwise direction in FIG. 8, it may be known that a direction previewing the second real object 112 is a direction rotating by about 35 degrees from due north in a clockwise direction. Accordingly, an object identification system according to the present invention may identify a direction previewing a real object without a direction sensor or a compass.

Object identification systems according to Exemplary Embodiments 2 to 4 of the present invention may be used as a digital compass outputting an azimuth value of a virtual object matched with the previewed real object as an azimuth value of a direction previewing the real object. The azimuth value of the direction previewing the real object may be outputted to a display 110 of a terminal. For example, in Exemplary Embodiments 2 to 4 of the present invention, each of the terminals 260, 360 and 460 may be a digital compass outputting an azimuth value of a virtual object matched with the previewed real object as an azimuth value of a direction previewing the real object.

When an object identification system according to the present invention, a terminal not having a direction sensor or a distance sensor may identify a real object. Moreover, although a server does not secure image data of large capacity in advance, a terminal may identify a real object. Furthermore, since a terminal may identify a direction previewing a real object without an additional direction sensor, the terminal may play a role of a direction sensor or a digital compass. Moreover, an object identification system according to the present invention may be adapted to a terminal having a direction sensor. In this case, in order to more accurate identify an object, the object identification method or the object identification system may perform a function of complementing a function of the direction sensor. Thus, it may identify a real object in a more accurate, and it may enhance a quality of an object identification system or an augmented reality server.

The present invention may be used in an object identification system relating to a virtual object of a virtual world and a real object of a real world, a wireless internet system, an augmented reality service system, an application software program used in the systems, etc. Moreover, the present invention may replace a direction or may complement a function of the direction sensor. Furthermore, the present invention may be used as a digital compass According to the present invention, since a real object may be identified in a more accurate, it may enhance a quality of an object identification system or an augmented reality server. Moreover, since a terminal may identify a direction previewing a real object without an additional direction sensor, the present invention may be employed to a terminal not having a direction sensor.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. An object identification system comprising:
a first pattern data generating part configured to divide a first angle section corresponding to images of previewed real objects into a first angle gap which is uniform with respect to a position where the real objects are previewed, to calculate boundaries between the real objects from images of the real objects, and to generate a first pattern data configured by set of first indicators which corresponds to each angles of the first angle section divided into the first angle gap and which varies every boundary between the calculated real objects;
a map data storing part configured to store a map data comprising virtual objects having a second indicator and an outline data as attribute value;
a second pattern data generating part configured to divide the map data into a second angle gap which is uniform with respect to a position where the real objects are previewed, to extract a virtual object having an outline firstly meet with a radiating line corresponding to each map angle of the divided into the second angle gap, and to generate a second pattern data configured by set of second indicators corresponding to each map angle; and
an object identifying part configured to compare with a first arrangement pattern of first indicators arranged on the first angle section and a second arrangement pattern of second indicators arranged on a second angle section substantially equal to the first angle section, to match the first indicators into second indicators having a repeat ratio substantially equal to a repeat ratio of the first indicators in an angle section, to match a real object disposed on an angle corresponding to the matched first indicator into a virtual object having a second indicator matched with the first indicator as an attribute value, and to extract virtual objects matched with each of the previewed real objects,
wherein the first angle gap is one of n times ('n' is an integer) and 1/n times of the second angle gap.

2. The object identification system of claim 1, wherein boundaries of the previewed real objects are calculated by adapting an image edge detection method to images of the real objects.

3. The object identification system of claim 1, wherein outline data of the map data comprises position values corresponding to corners of each virtual object, and outlines of each virtual object is a straight line connecting position values of neighboring corners of each virtual object.

4. The object identification system of claim 1, wherein an outline data of the virtual object comprises a position value of the virtual object and relative position values between corners of the virtual object and the position value of the virtual object, positions of each corners of the object are calculated by a position value of the virtual object and relative position values between corners of the virtual object and a position value of the virtual object, wherein outlines of each of the virtual objects on the map data is a straight line connecting adjacent corner positions of each of the virtual objects.

5. The object identification system of claim 1, wherein the first pattern data generating part, the map data storing part, the second pattern data generating part and the object identifying part are comprised in a server computer.

6. The object identification system of claim 5, wherein the server computer receives images of the previewed real objects and position value of a mobile terminal from the mobile terminal, and the position value of the mobile terminal corresponds to a position where the real objects are previewed.

7. The object identification system of claim 5, wherein the server computer transmits an attribute value of a virtual object matched with the previewed real object to the mobile terminal.

8. The object identification system of claim 1, wherein the first pattern data generating part is comprised in a mobile terminal, wherein the second pattern data generating part and the object identifying part are comprised in a server computer, and wherein the server computer receives a position value of a mobile terminal and the first pattern data generated in the first pattern data generating part from the mobile terminal.

9. The object identification system of claim 1, wherein the object identification system comprises a mobile terminal having the first pattern data generating part, the map data storing part, the second pattern data generating part and the object identifying part.

10. A method of identifying an object, the method comprising:

dividing a first angle section corresponding to images of previewed real objects into a first angle gap which is uniform with respect to a position where the real objects are previewed, calculating boundaries between the real objects from images of the real objects, and generating a first pattern data configured by set of first indicators which corresponds to each angles of the first angle section divided into the first angle gap and which varies every boundary between the calculated real objects;

dividing a map data comprising virtual objects having a second indicator and an outline data as attribute value into a second angle gap which is uniform with respect to a position where the real objects are previewed, extracting a virtual object having an outline firstly meet with a radiating line corresponding to each map angle of the divided into the second angle gap, and generating a second pattern data configured by set of second indicators corresponding to each map angle; and comparing with a first arrangement pattern of first indicators arranged on the first angle section and a second arrangement pattern of second indicators arranged on a second angle section substantially equal to the first angle section, matching the first indicators into second indicators having a repeat ratio substantially equal to a repeat ratio of the first indicators in an angle section, matching a real object disposed on an angle corresponding to the matched first indicator into a virtual object having a second indicator matched with the first indicator as an attribute value, and extracting virtual objects matched with each of the previewed real objects, wherein the first angle gap is one of n times ('n' is an integer) and 1/n times of the second angle gap.

11. The method of claim 10, further comprising:

outputting an attribute value of a virtual object matched with the previewed real object to the previewed image.

12. The method of claim 10, wherein boundaries of the previewed real objects are calculated by employing an image edge detection method to images of the real objects.

* * * * *